US010480362B2

(12) United States Patent
McCarthy, Jr. et al.

(10) Patent No.: US 10,480,362 B2
(45) Date of Patent: Nov. 19, 2019

(54) INDUCTIVE COUPLING TO ROCKER ARM ASSEMBLIES

(71) Applicant: Eaton Intelligent Power Limited, Dublin (IE)

(72) Inventors: James Edward McCarthy, Jr., Canton, MI (US); Phillip A. Rhinehart, Austin, TX (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/083,913

(22) PCT Filed: Mar. 8, 2017

(86) PCT No.: PCT/US2017/021357
§ 371 (c)(1),
(2) Date: Sep. 11, 2018

(87) PCT Pub. No.: WO2017/156125
PCT Pub. Date: Sep. 14, 2017

(65) Prior Publication Data
US 2019/0257227 A1     Aug. 22, 2019

Related U.S. Application Data

(60) Provisional application No. 62/306,992, filed on Mar. 11, 2016.

(51) Int. Cl.
*F01L 13/00* (2006.01)
*F01L 1/18* (2006.01)
(Continued)

(52) U.S. Cl.
CPC ......... *F01L 13/0021* (2013.01); *F01L 1/185* (2013.01); *F01L 1/24* (2013.01); *F01L 13/0005* (2013.01);
(Continued)

(58) Field of Classification Search
CPC ... F01L 2001/186; F01L 1/46; F01L 13/0005; F01L 2013/101; F01L 2013/11;
(Continued)

(56) References Cited

U.S. PATENT DOCUMENTS 3,040,217 A    8/1959   Conrad
4,203,397 A    5/1980   Soeters, Jr.
(Continued)

FOREIGN PATENT DOCUMENTS

EP         2050933 A1    4/2009

*Primary Examiner* — Jorge L Leon, Jr.
(74) *Attorney, Agent, or Firm* — Paul V. Keller

(57) ABSTRACT

An internal combustion engine includes a cylinder head and a valvetrain including a poppet valve, a cam shaft on which is mounted a cam, and a rocker arm assembly. The rocker arm assembly includes a rocker arm and a cam follower configured to engage the cam as the cam shaft rotates. The rocker arm assembly is operative to transmit force from the cam to actuate the valve and includes an electrical device mounted to the rocker arm. A first electrical circuit includes the electrical device and a first conductor mounted to the rocker arm and a second electrical circuit includes a second conductor mounted off the rocker arm. The first and second conductors are inductively coupled to an extent that enables effective power transfer or communication between them. Inductive power transfer avoids the use of wires that could become caught, clipped, or fatigued and consequently short out.

20 Claims, 16 Drawing Sheets

(51) Int. Cl.
*F01L 1/24* (2006.01)
*H01F 38/14* (2006.01)
*H01F 7/06* (2006.01)
*H02J 50/10* (2016.01)

(52) U.S. Cl.
CPC ............ H01F 7/064 (2013.01); H01F 38/14 (2013.01); *F01L 2001/186* (2013.01); *F01L 2013/001* (2013.01); *F01L 2013/101* (2013.01); *F01L 2013/11* (2013.01); *F01L 2105/00* (2013.01); *F01L 2201/00* (2013.01); *F01L 2820/031* (2013.01); *H02J 50/10* (2016.02)

(58) Field of Classification Search
CPC . F01L 2201/00; F01L 2820/031; H01F 7/064; H01F 38/14; H02J 50/10
USPC ............... 123/90.11, 90.16, 90.41, 90.44
See application file for complete search history.

(56) References Cited

U.S. PATENT DOCUMENTS

| | | | |
|---|---|---|---|
| 5,544,626 A | 8/1996 | Diggs et al. | |
| 6,318,317 B1* | 11/2001 | Hubschle | F01L 13/0005 |
| | | | 123/198 F |
| 6,318,318 B1 | 11/2001 | Jahr | |
| 9,228,454 B2 | 1/2016 | VanDeusen | |
| 2001/0004309 A1* | 6/2001 | Di Lieto | F01L 9/04 |
| | | | 361/160 |
| 2008/0006232 A1 | 1/2008 | Gregor et al. | |
| 2008/0141958 A1* | 6/2008 | Kim | F01L 1/185 |
| | | | 123/90.15 |

* cited by examiner

INDUCTIVE COUPLING TO ROCKER ARM ASSEMBLIES

FIELD

The present teachings relate to valvetrains, particularly valvetrains providing variable valve lift (VVL) or cylinder deactivation (CDA).

BACKGROUND

Hydraulically actuated latches are used on some rocker arm assemblies to implement variable valve lift (VVL) or cylinder deactivation (CDA). For example, some switching roller finger followers (SRFF) use hydraulically actuated latches. In these systems, pressurized oil from an oil pump may be used for latch actuation. The flow of pressurized oil may be regulated by an oil control valve (OCV) under the supervision of an engine control unit (ECU). A separate feed from the same source provides oil for hydraulic lash adjustment. In these systems each rocker arm assembly has two hydraulic feeds, which entails a degree of complexity and equipment cost. The oil demands of these hydraulic feeds may approach the limits of existing supply systems.

The complexity and demands for oil in some valvetrain systems can be reduced by replacing hydraulically latched rocker arm assemblies with electrically latched rocker arm assemblies. Electrically latched rocker arm assemblies require power. Regardless of whether electric latches are used, there has been a long felt need to provide sensors on switching and cylinder deactivating rocker arm assemblies to provide diagnostic information.

SUMMARY

Some aspects of the present teachings relate to an internal combustion engine that includes a cylinder head and a valvetrain. The valvetrain include a poppet valve having a seat within the cylinder head, a cam shaft on which is mounted an eccentrically shaped cam and a rocker arm assembly. The rocker arm assembly includes a rocker arm that is mobile relative to the cylinder head and a cam follower configured to engage the cam as the cam shaft rotates. The rocker arm assembly is operative to transmit force from the cam to actuate the valve. The rocker arm assembly includes an electrical device mounted to the rocker arm. If the electrical device is wired conventionally, a wire could become caught, clipped, or fatigued and consequently short out.

According to some aspects of the present teachings, a first electrical circuit includes the electrical device and a first conductor that is mounted to the rocker arm and a second electrical circuit includes a second conductor mounted off the rocker arm. The second conductor may be mounted in a position that is stationary relative to the cylinder head. The first and second conductors are inductively coupled to an extent that enables effective power transfer or communication between the first and second circuits. In these teachings, the first and second conductors are mutually-inductively coupled. In some of these teachings, the mutually-inductively coupled conductors are coils, a first coil forming part of the first circuit and a second coil forming part of the second circuit. Having the conductors wound into coils may increase mutual inductance.

In some of these teachings the coils are wound about laminated cores. Laminated cores are desirable for AC power transfer. AC power transfer may provide higher power transfer efficiencies as compared to DC power transfer for coils of similar size and proximity. In some of these teachings, the second circuit is configured to drive the second coil with AC power in the range from 50 kHz to 1 MHz. AC power transfer through inductive coupling may be most efficient in that range.

A high coupling factor between the inductively coupled coils may be necessary for some of the applications contemplated herein to be practicable. In some of these teachings, the coils are mounted whereby the spacing between coils is less than 2 cm. In some of these teachings, the coils are similar in diameter. In some of these teachings, the coils are mounted whereby the spacing between them is less than five times the diameter of the windings in one of the coils. In some of these teachings, the coils have central axes that are substantially aligned. These dimensions may provide a high coupling factor between the first and second coils. In some of these teachings, the coupling factor is at least 0.1. In some of these teachings, the coupling factor is at least 0.3. A coupling factor of 0.3 is generally achievable according to the teachings herein. To the extent that the two coils undergo relative motion with rocker arm assembly operation, it is sufficient if the dimensions and coupling factors referred to in this paragraph are satisfied within only a portion of that range of relative motion. In some of these teachings, one or more pole pieces are configured to facilitate inductive power transfer between the first and second coils. The pole pieces may guide magnetic fields generated by the second coil toward the first coil and thereby create additional flexibility in positioning and sizing the first and second coils.

In some of these teachings, the second coil is mounted to a hydraulic lash adjuster. In some of these teachings, the second coil is mounted to a cam carrier. In some of these teachings, the second coil is mounted to a cylinder head. Any of these may be a suitable location for mounting the coil of a second circuit in such a way that it can be wired without any of the wires being forced to undergo excessive motion.

In some of these teachings, a sensor is mounted to the rocker arm. The sensor may be operable to communicate with the control unit of the engine through the first and second circuits. In some of these teachings, the sensor is operative to generate power. In some of these teachings, the sensor is an accelerometer. In some of these teachings, the first circuit includes a generator mounted to the rocker arm assembly in addition to the sensor. In some of these teachings, the first circuit includes an oscillator for generating an AC current from a DC power source.

In some of these teachings, the rocker arm assembly includes an electromagnetic latch assembly having a latch pin and a solenoid powered through the first electrical circuit. In some of these teachings, the first electrical circuit includes a rectifier positioned to convert AC power inductively transferred to the first coil into DC power for energizing the solenoid. A solenoid energized with DC power may be made more compact than one energized with AC power. The latch pin may have first and second positions. One of these may be an extended or engaging position while the other is a retracted or non-engaging position. With the latch pin in the first position, the rocker arm assembly may be operative to actuate the poppet valve in response to rotation of the cam shaft to produce a first valve lift profile. With the latch pin in the second position, the rocker arm assembly may be operative to actuate the valve in response to rotation of the cam shaft to produce a second valve lift profile, which is distinct from the first valve lift profile, or the poppet valve may be deactivated.

In some of these teaching, the rocker arm assembly is configured to keep the rocker arm to which the electrical device is mounted substantially stationary relative to the cylinder head while the solenoid is energized. This configuration facilitates inductive power transfer over extended periods because the mutually inductively coupled coils may remain substantially stationary relative to one another as long as the solenoid remains energized. In some of these teachings, the first coil of the first circuit is mounted proximate an axis of pivoting or rotation of the rocker arm. In some of these teachings, the first coil is mounted to a spring post of the rocker arm. In this configuration, rocker arm motion may have relatively little effect on the spacing between the mutually inductively coupled coils allowing power transfer to occur regardless of where the rocker arm is in its range of motion.

In some of these teachings, an electromagnetic latch assembly is bi-stable in the sense of being structured to stably maintain the latch pin's position independently from the solenoid both when the latch pin is in the first position and when the latch pin is in the second position. With this structure, power does not need to be provided to the electromagnetic latch assembly accept to switch the latch pin position. With that structure, the inductive coupling need only be effective at a single point within the range of motion of the rocker arm to which the first coil is mounted. In some of these teachings, the rocker arm assembly is operative to move the first coil through a range of motion relative to the second coil as the cam follower is lifted by the cam. In some of these teachings, the portion of the range of motion over which the mutual inductive coupling is effective for power transfer includes the position at which the rocker arm resides when the cam is on base circle. In some of these teachings, the coils are mounted such that their closest approach occurs when the cam is on base circle.

In some aspects of the present teachings, the bi-stable latch is operative to toggle between the first and the second positions in response to repeated application of a force in one direction. The electromagnetic latch assembly may then be actuated in either direction by briefly powering the solenoid, even if the solenoid is configured to apply force in only one direction. In some of these teachings, the electromagnetic latch assembly includes a latch cam configured to rotate in response to a translation of the latch pin. In some of these teachings, a set of one or more springs or magnets may maintain the latch pin in either the extended or the retracted position according to the angular position of the latch cam.

According to some aspects of the present teachings, a bi-stable electromagnetic latch assembly includes a permanent magnet that contributes to the positional stability of the latch pin both when the latch pin is in the first position and when the latch pin is in the second position. According to some further aspects of these teachings, the electromagnetic latch assembly is structured to operate through a magnetic flux path-shifting mechanism. The electromagnetic latch assembly may provide two distinct magnetic circuits, one or the other of which is operative to be the primary path for magnet flux from the permanent magnet depending on the whether the latch pin is in the first position or the second position, absent magnetic fields from the solenoid or any external source that might alter the path taken by the magnetic flux. In some of these teachings, actuating the latch pin may involve using the solenoid to redirect the permanent magnet's flux from the one circuit to the other. An electromagnetic latch assembly structured to be operable through a flux path-shifting mechanism may be smaller than one that is not so structured. In some of these teachings, the permanent magnet is fixedly mounted to the rocker arm. Fixing the permanent magnet to the rocker arm means not fixing the permanent magnet to the latch pin. Taking the weight of the permanent magnet off the latch pin may increase actuation speed and allow the use of a smaller solenoid.

In some of the present teaching, the electromagnetic latch assembly includes at least one permanent magnet and the internal combustion engine has circuitry operable to energize the solenoid with a current in either a first direction or a second direction, which is the reverse of the first direction. The solenoid powered with current in the first direction may be operative to actuate the latch pin from the first position to the second position. The solenoid powered with current in the second direction may be operative to actuate the latch pin from the second position to the first position. In some of these teachings the two solenoids may be provided as two coils having windings in opposite directions. One or the other coil may be energized depending on the desired direction of the current. Employing two solenoid coils may simplify the control circuitry. Employing only one solenoid coil may provide the most compact design.

Some aspects of the present teachings relate to structures for powering a solenoid on a rocker arm with direct current (DC) in either a first direction or a second direction from alternating current (AC) induced in one more conductors mounted to the rocker arm. In some of these teachings, two coils for receiving AC power are mounted to the rocker arm. Each of the two coils may be inductively coupled with another coil that is mounted off the rocker arm. In some of these teachings, the two coils are located on opposite sides of the rocker arm. Circuitry on the rocker arm may be structured whereby inducing an alternating current in one of the inductively coupled coils mounted to the rocker arm results in direct current through the solenoid in a first direction and inducing an alternating current in the other inductively coupled coil mounted to the rocker arm results in direct current through the solenoid in a reverse of the first direction. Alternatively, the circuitry may connect the inductively coupled coils mounted to the rocker arm to one of two solenoid coils that have opposite windings in opposite directions. The circuitry may include rectifiers, one in association with each of the inductively coupled coils.

In some of these teachings, the rocker arm assembly includes a switch. In some of these teachings, the switch is configured to control the direction in which DC current is driven through the solenoid when AC current is induced in an inductively coupled coil. The switch may be implemented with circuitry. But in some of these teachings, the switch is a mechanical one that is tied to the movement of the latch pin. A mechanical switch may be more reliable than one that relies on capacitors and the like, which may not perform consistently over the range of temperatures that occur during operation of the internal combustion engine. In some of these teachings, the switch selects between one of two rectifying circuits. In some of these teachings, the switch selects the polarity with which a DC voltage source is coupled to the solenoid. In some alternative teachings, the switch selects between which of two solenoid coils is powered. The coils may have opposite windings whereby one coil actuates the latch pin in one direction while the other actuates the latch pin in the opposite direction.

Some aspects of the present teachings relate to an internal combustion engine that includes a plurality of poppet valves having seats within the cylinder head, a plurality of eccentrically shaped cams mounted on one or more cam shafts, and a plurality of rocker arm assemblies comprising cam followers each configured to engage one of the cams as it rotates and each operative to transmit force from that cam to actuate one of the valves. A plurality of these rocker arm assemblies may have a rocker arm that is mobile relative to the cylinder head and to which a conductor mounted. Each of these conductors may be mutually-inductively coupled with another conductor mounted off the rocker arms. In some of these teachings, the mutually-inductively coupled conductors mounted on and off the rocker arms are coils. In some of these teachings, there is a distinct coil mounted off the rocker arms for each inductively coupled coil mounted to one of the rocker arms. In some of these teachings, there is one distinct coil mounted off the rocker arms for every two coils mounted to one of the rocker arms. In some of these teachings, the distances between the mutually-inductively coupled coils are substantially less than the distances between rocker arm assemblies. A coil mounted off the rocker arms may be located between and mutually inductively coupled with each of two coils mounted on rocker arms of adjacent rocker arm assemblies. According to some aspects of the present teachings, the internal combustion engine further includes a framework to which a plurality of the second coils are mounted. The framework may facilitate installation and positioning of the multiple coils.

Some aspects of the present teachings relate to a method of operating one of the foregoing internal combustion engines. The method includes making one more measurements of voltage, current, resistance, or impedance in the second circuit and using the measurements to make a diagnostic determination regarding the rocker arm assembly. The diagnostic determination may relate to the proximity of the first and second coils. In some of these teachings, the diagnostic determination relates to whether a rocker arm assembly latch is engaged. In some of these teachings, the second circuit is pulsed in relation to making one or more of the measurements.

Some aspects of the present teachings relate to a valve actuation module or a method of manufacturing an internal combustion engine as previously described using the valve actuation module. The valve actuation module includes a frame to which is attached a group of parts including mutually inductively coupled first and second coils. In some of these teachings, a rocker arm assembly including a rocker arm and a hydraulic lash adjuster is attached to the frame. In some of these teachings, a plurality of rocker arm assemblies are attached to the frame. In some of these teachings, a wiring harness including wiring of the second circuit is attached to the frame. The method includes installing the valve actuation module in a cylinder head. This allows a plurality of parts to be installed simultaneously. In some of these teachings, a temporary connection holds a rocker arm and a hydraulic lash adjuster together while they are attached to the frame. The temporary connection can be a breakaway connector. The temporary connection can be removed after installation of the valve actuation module.

The primary purpose of this summary has been to present certain of the inventors' concepts in a simplified form to facilitate understanding of the more detailed description that follows. This summary is not a comprehensive description of every one of the inventors' concepts or every combination of the inventors' concepts that can be considered "invention". Other concepts of the inventors will be conveyed to one of ordinary skill in the art by the following detailed description together with the drawings. The specifics disclosed herein may be generalized, narrowed, and combined in various ways with the ultimate statement of what the inventors claim as their invention being reserved for the claims that follow.

BRIEF DESCRIPTION OF THE DRAWINGS

Spatially relative terms, such as "beneath," "below," "lower," "above," "upper" and the like are used in the following detailed description to describe spatial relationships as illustrated in these drawings. Those relationships are independent from the orientation of any illustrated device in actual use.

DETAILED DESCRIPTION

Figure 1:
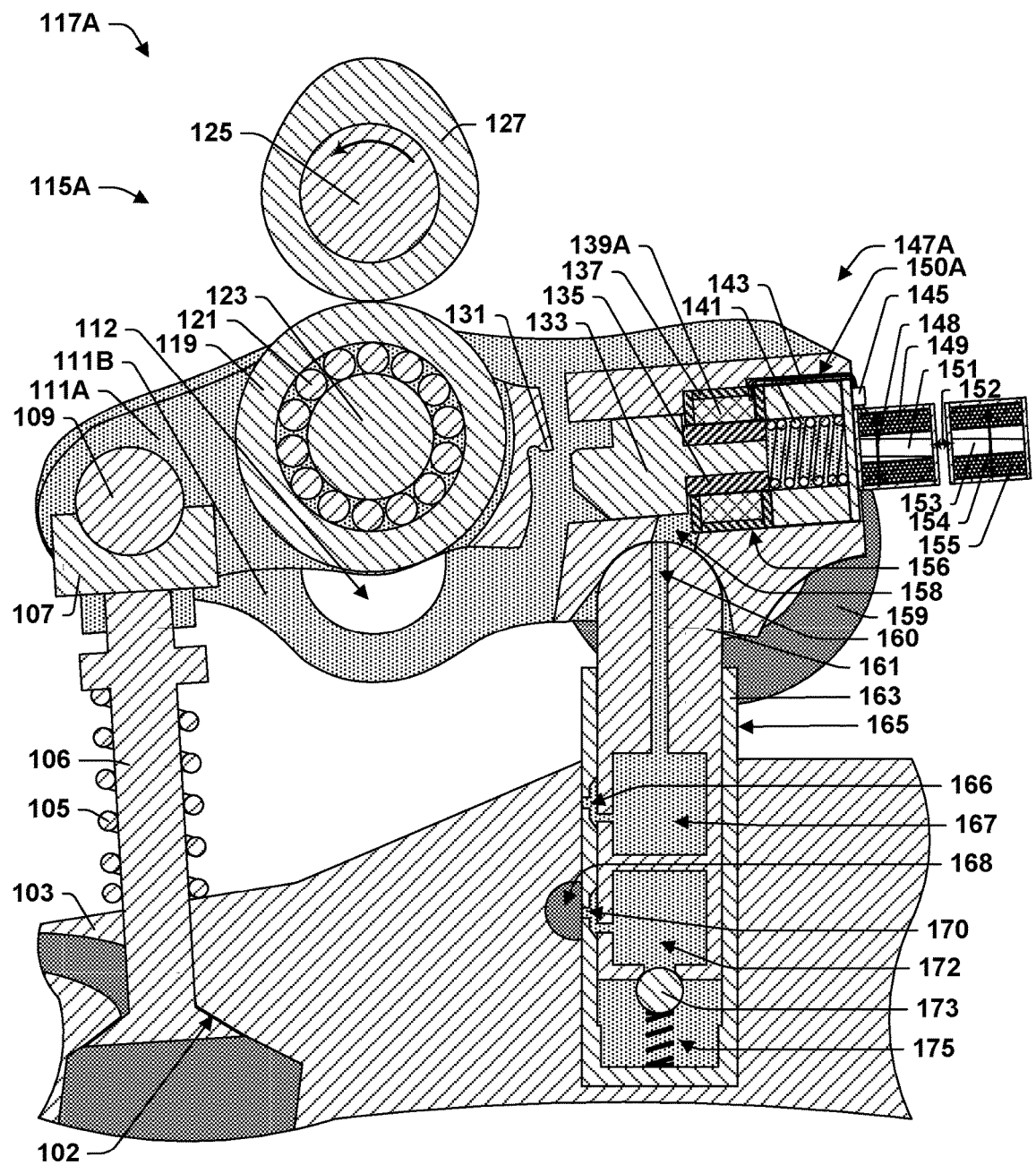
FIG. 1 is a cross-sectional side view of a portion of an internal combustion according to some aspects of the present teachings including a rocker arm assembly in a non-engaging configuration and a cam on base circle.

In the drawings, some reference characters consist of a number followed by a letter. In this description and the claims that follow, a reference character consisting of that same number without a letter is equivalent to a listing of all reference characters used in the drawings and consisting of that same number followed by a letter. For example, "permanent magnet 201" is the same as "permanent magnet 201A, 201B". Permanent magnet 201 is there for a generic reference that includes the specific instances permanent magnet 201A and permanent magnet 201B. Where options are provided for one instance subject to a generic reference, those options are to be given consideration in connection with all instances subject to that generic reference.

FIGS. 1-4 illustrate an internal combustion engine 117A in accordance with some of the present teachings. Referring to FIG. 1, internal combustion engine 117A includes cylinder head 103 and valvetrain 115A. Valvetrain 115A includes poppet valve 106, which has a seat 102 within cylinder head 103, cam shaft 125, on which is mounted eccentrically shaped cam 127, and rocker arm assembly 147A. Rocker arm assembly 147A may include inner arm 111A, to which cam follower 119 is mounted, outer arm 111B, and hydraulic lash adjuster 165. Both rocker arms 111 are mobile relative to cylinder head 103. Cam follower 119 may be a roller follower and is configured to engage cam 127 as cam shaft 125 rotates. Rocker arm assembly 147A is operative to transmit force from cam 127 to actuate valve 106.

Figure 5:
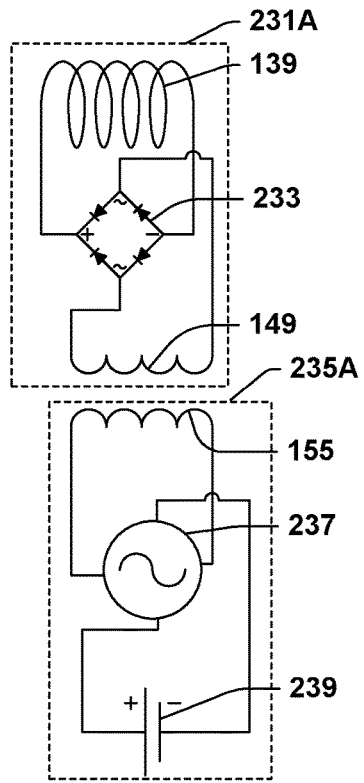
FIG. 5 is a diagram of first and second electrical circuits according to some aspects of the present teachings.
Figure 6:
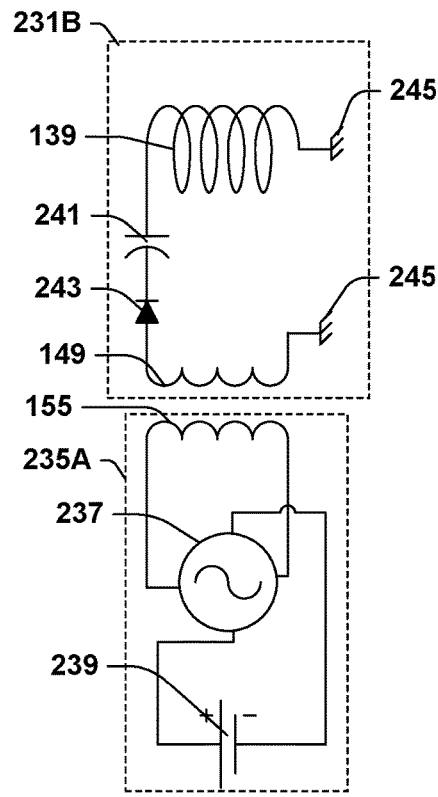
FIG. 6 is a diagram of first and second electrical circuits according to some other aspects of the present teachings.

An electrical device 139, which is solenoid 139A, and a coil 149, which is a conductor, are mounted to outer arm 111B. Solenoid 139A, coil 149, and additional electrical components 145, may be connected through wires 143 to form a first electrical circuit 231 for which FIGS. 5 and 6 provide example diagrams. Another coil 155 is mounted off outer arm 111B. The mounting of coil 155 in engine 117A is not shown. Coil 155 may be mounted to cylinder head 103 or another component, such as a cam carrier, that is stationary relative to the cylinder head 103. Coil 155 may alternatively be mounted to hydraulic lash adjuster 165 or another component that may remain substantially stationary relative to cylinder head 103 while outer arm 111B moves. Coil 155 is mounted in such a position that it is mutually inductively coupled with coil 149 at least when cam 127 is on base circle as it is in FIGS. 1 and 2.

Coil 149 may be wound about laminated core 151 and coil 155 may be wound about laminated coil 153. Laminated cores 151 and 153 may be operative to reduce eddy currents and increase power transfer efficiency between coils 155 and 149 when one or the other is driven with an AC current in the range from 50 kHz to 1 MHz. Coil 155 may be part of a second circuit 235 that is operative to provide such a driving current. FIG. 5 provides a diagram for an example second circuit 235A that may be so operative.

Figure 2:
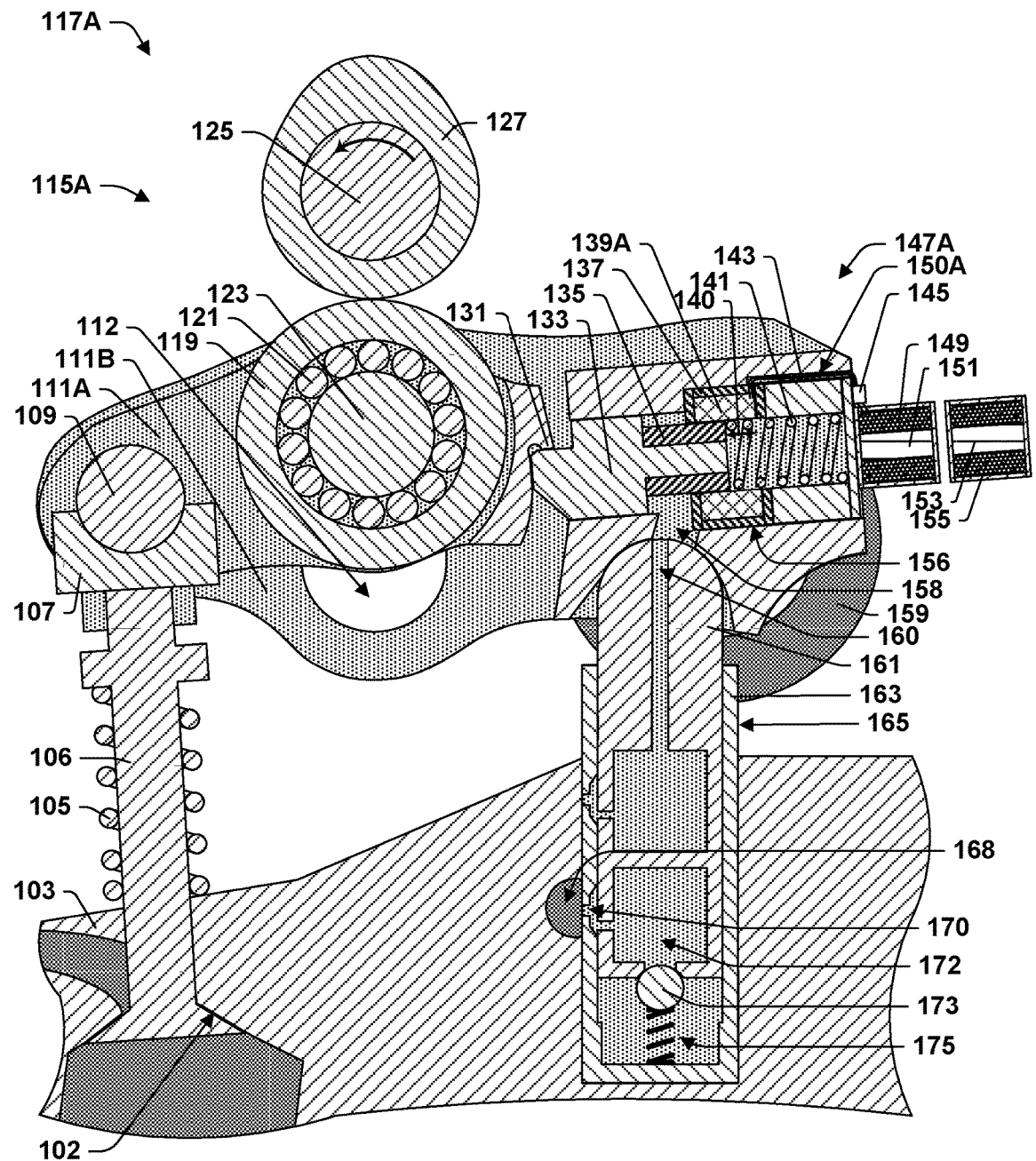
FIG. 2 provides the view of FIG. 1, but with the rocker arm assembly in an engaging configuration.

Solenoid 139A may be part of an electromagnetic latch assembly 150A mounted to outer arm 111B. Electromagnetic latch assembly 150A may further include a spring 141 and a latch pin 133. Latch pin 133 may be formed of a low coercivity ferromagnetic material such as soft iron. Alternatively, a low coercivity ferromagnetic part such as annular ring 135 may be mounted to latch pin 133. Latch pin 33 is translatable between extended and retracted positions. Spring 141 may bias latch pin 133 toward the extended position, which is shown in FIG. 2. Solenoid 139A may be operative when energized to exert a magnetic force on low coercivity ferromagnetic ring 135 and draw latch pin 133 to the retracted position, which is shown in FIG. 1. A shell 137 of low coercivity ferromagnetic material may be formed around solenoid 139A to increase the force of its action on latch pin 133.

Figure 3:
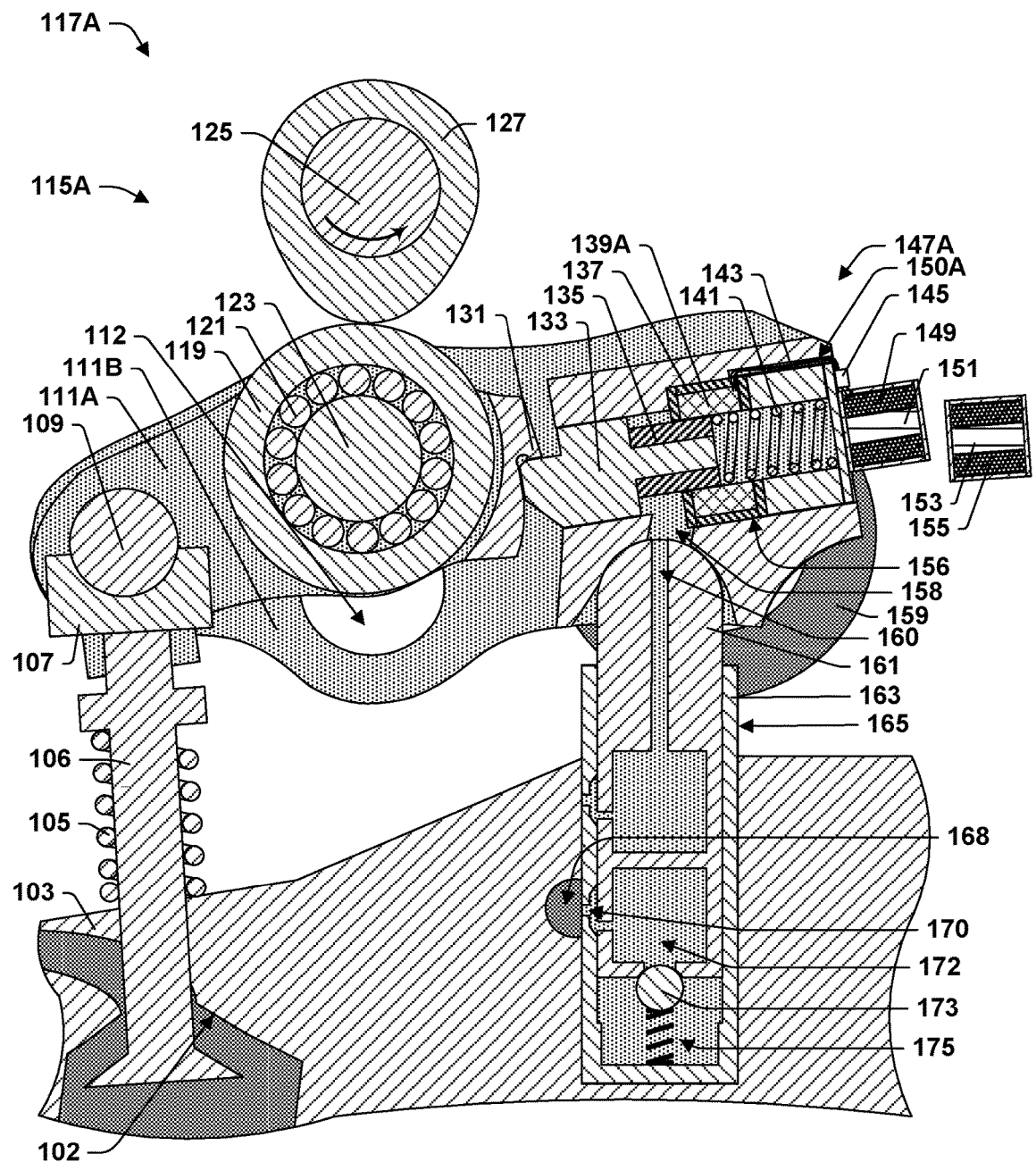
FIG. 3 provides the view of FIG. 2, but with the cam risen off base circle.

The extended position for latch pin 133 may be described as an engaging position and provides an engaging configuration for rocker arm assembly 147A. If cam 127 is rotated while latch pin 133 is in the engaging position, latch pin 133 may engage lip 131 of inner arm 111A. The force of cam 127 on cam follower 119 may then cause both inner arm 111A and outer arm 111B to pivot together on hydraulic lash adjuster 165, bearing down on valve 106 and compressing valve spring 105 as shown in FIG. 3. Valve 106 may thus be lifted off its seat 102 with a valve lift profile determined by the shape of cam 127. The valve lift profile is the shape of a plot showing the height by which valve 106 is lifted off its seat 102 as a function of angular position of cam shaft 125. In the engaging configuration, cam shaft 125 may do work on rocker arm assembly 147 as cam 127 rises off base circle. Much of the resulting energy may be taken up by valve spring 105 and returned to cam shaft 125 as cam 127 descend back toward base circle.

Figure 4:
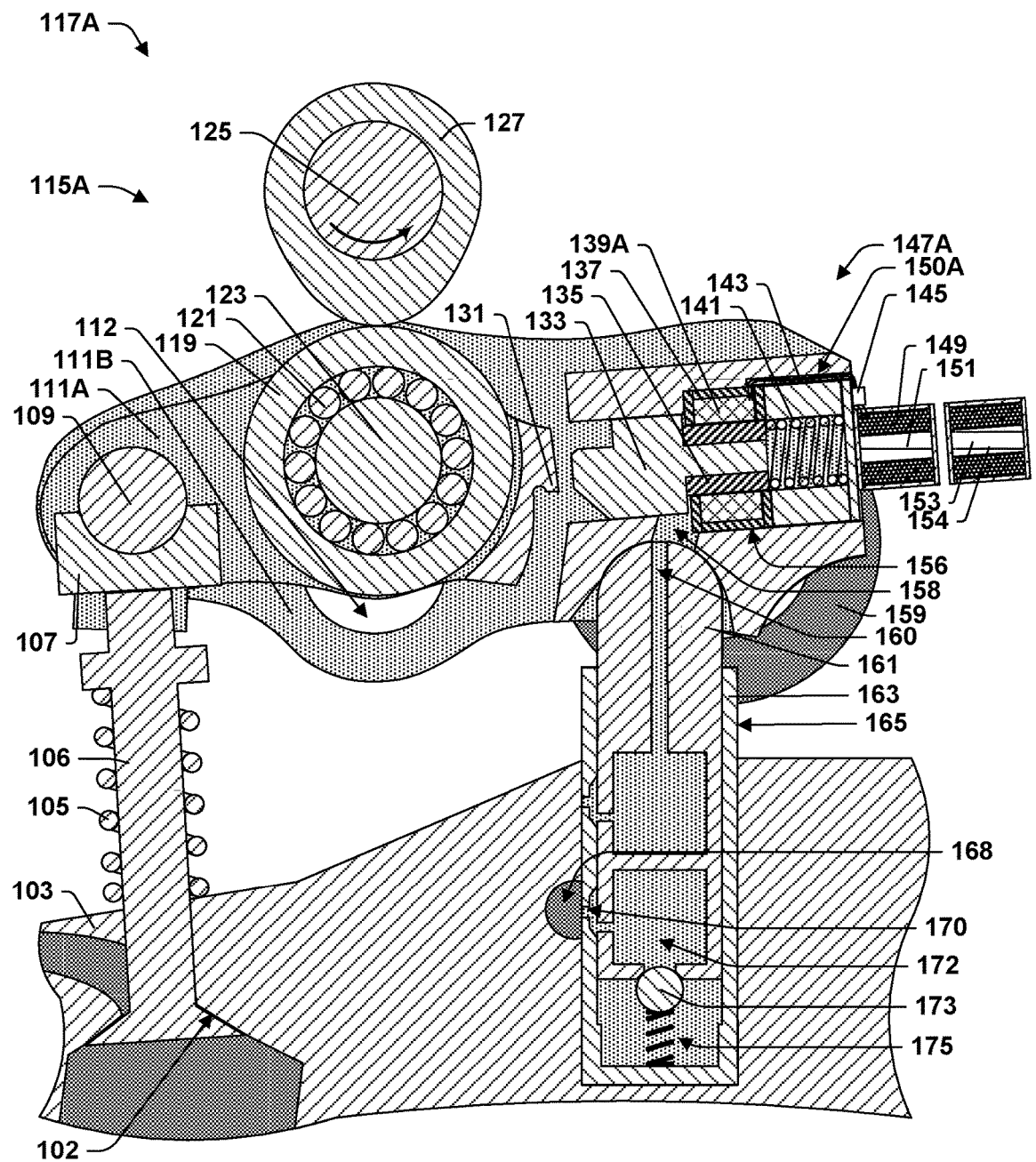
FIG. 4 provides the view of FIG. 1, but with the cam risen off base circle.

FIG. 4 shows the result if cam 127 is rotated while latch pin 133 is in the non-engaging position. The downward force on cam follower 119 may be distributed between valve 106 and torsion springs 159. Torsions springs 159 may be tuned relative to valve spring 105 such that torsion springs 159 yield in the non-engaging configuration while valve spring 105 does not. Inner arm 111A may descend as torsion springs 159 wind and outer arm 111B may remain in place. As a result, valve 106 may remain on its seat 102 even as cam 127 rotates. In the non-engaging configuration, cam shaft 125 still does work on rocker arm assembly 106 as cam 127 rises of base circle. But in this case, most of the energy is taken up by torsions springs 159, which act as lost motion springs.

Electromagnetic latch assembly 150A is powered through inductive power transfer from coil 155 to coil 149. FIGS. 5 and 6 provide diagrams of example circuits 231 and 235 that may be used for that purpose. In both examples provided by these two figures, coil 155 is part of a circuit 235A that also includes an oscillator 237 and a DC power source 239. When the engaging position is desired for latch pin 133, oscillator 237 may be coupled to power source 239. Power source 239 may be, for example, a battery or an alternator. This coupling may be regulated through control circuitry (not shown). The control circuitry may include an engine control unit (ECU).

Figure 7:
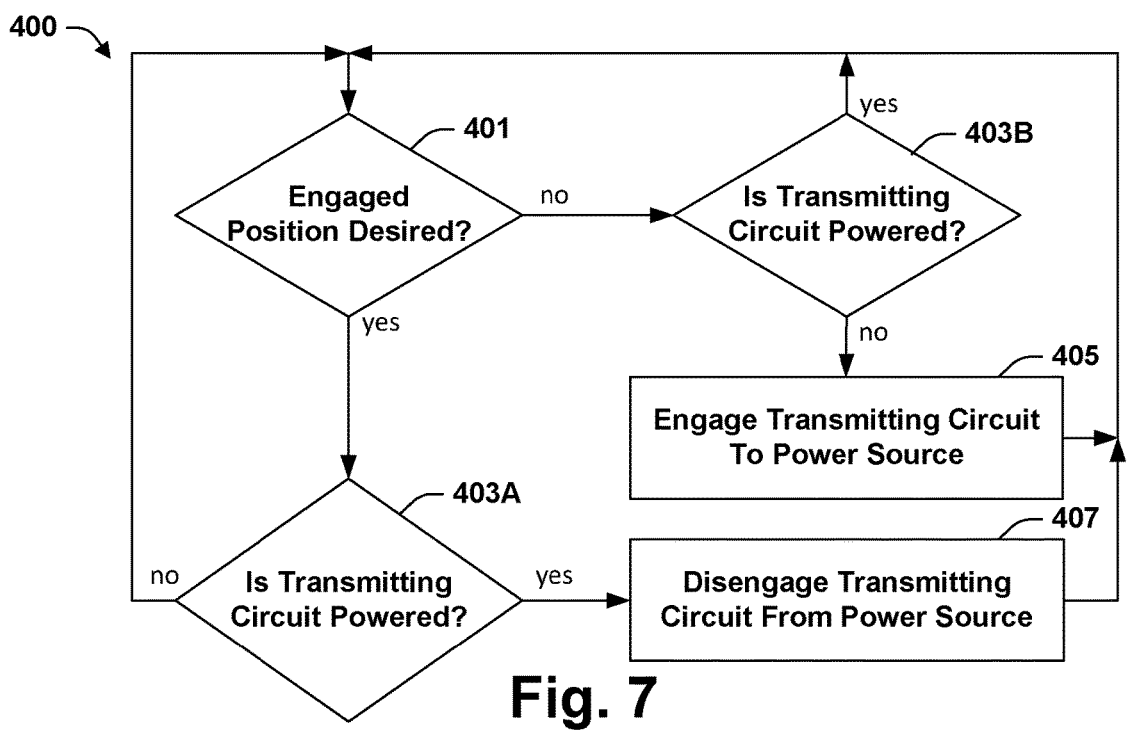
FIG. 7 is a flow chart for a method according to some aspects of the present teachings.

FIG. 7 is a flow chart of a method 400 that may be used to operate the engine 117A using the circuitry of FIG. 5 or 6. Method 400 begins with act 401, determining whether the engaging position is desired for latch pin 133. That determination may be made by an ECU and may relate to operating parameters for engine 117A such as speed and torque. A further determination may then be made in act 403A or 403B as to whether circuit 235A is currently closed. If the answer is yes and the engaging position is desired, method 400 proceeds with act 407 to open circuit 235A, disengaging coil 155 from its power source 239. If the answer is no and the engaging position is not desired, method 400 proceeds with act 407 to close circuit 235A and energize coil 155. In other cases, no action need be taken.

As show in FIG. 5, coil 149 may be connected with solenoid 139 through a full wave rectifier 233 as illustrated by circuit 231A. Alternatively, as shown in FIG. 6, coil 149 may be connected with solenoid 139 through a half wave rectifier 243 as illustrated by circuit 231B. Although the half wave rectifier 243 reduces power as compared to the full wave rectifier 233, half wave rectifier 243 allows coil 149 to be connected to solenoid 139 using only a single wire 143. A ground connection 245 may be made through a structural element such as the body of outer arm 111B. A capacitor 241 may be provided to steady the power supply to solenoid 139. On the other hand, solenoid 139 may have sufficient capacitance that capacitor 241 is unnecessary.

When cam 127 is on base circle, the coupling factor between coils 155 and 149 may be 0.3 or greater. The relative sizes and positioning of coils 149 and 155 may facilitate achievement of this coupling factor. For example, with reference to FIG. 1, the spacing 152 between coils 155 and 149 may be made 2 cm or less. This spacing 152 may be less than five times the diameter 154 of the windings in coil 155 and less than five times the diameter 148 of the windings in coil 149. In some of these teachings, spacing 152 is less than either diameter 148 or 154. In the present context, if the larger of diameters 148 and 154 is 50% or less above the smaller, diameters 148 and 154 are considered similar.

When cam 127 is on base circle, the axes of coils 155 and 149 are substantially aligned. This is the point at which rocker arms 111 are least lifted by cam 127 and may be the point at which coils 155 and 149, or the central axes thereof, are at their closest approach. In engine 117A, as cam 127 rises to maximum lift while latch pin 133 is in the engaging position, the axes of coils 155 and 149 may become slightly offset as shown in FIG. 3. In this configuration, coils 155 and 149 may or may not still remain inductively coupled to an extent that permits effective power transfer or communication between them. This may not matter because powering solenoid 139A may keep latch pin 133 in the non-engaging position. When rocker arm assembly 147A is in the non-engaging position, outer arm 111B to which coil 149 is mounted may remain stationary relative to coil 155. Outer arm 111B, may be raised up or down slightly due to the action of HLA 165, but outer arm 111B still remains substantially stationary.

Figure 8:
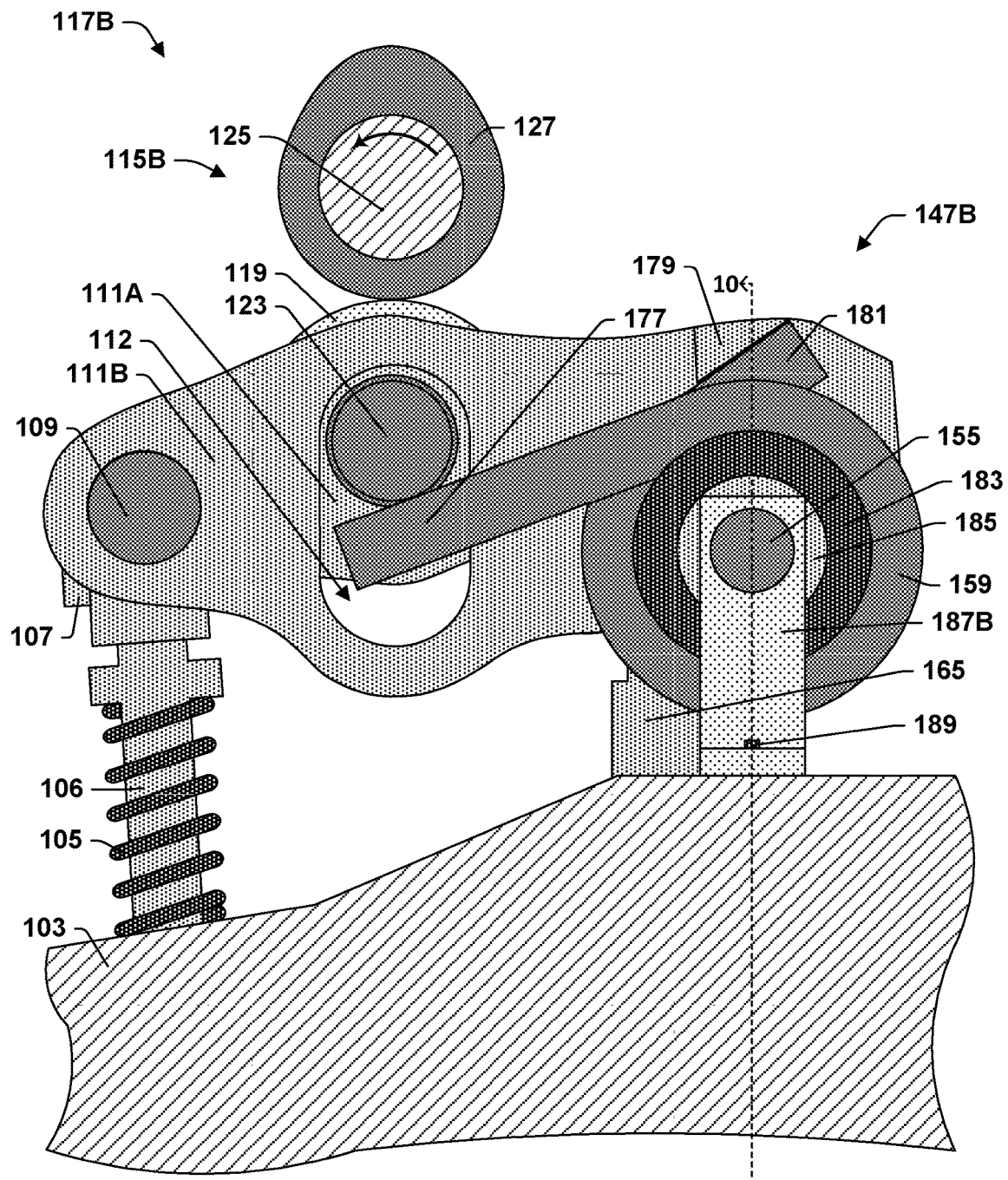
FIG. 8 provides a side view of a portion of an internal combustion engine according to some other aspects of the present teachings.
Figure 9:
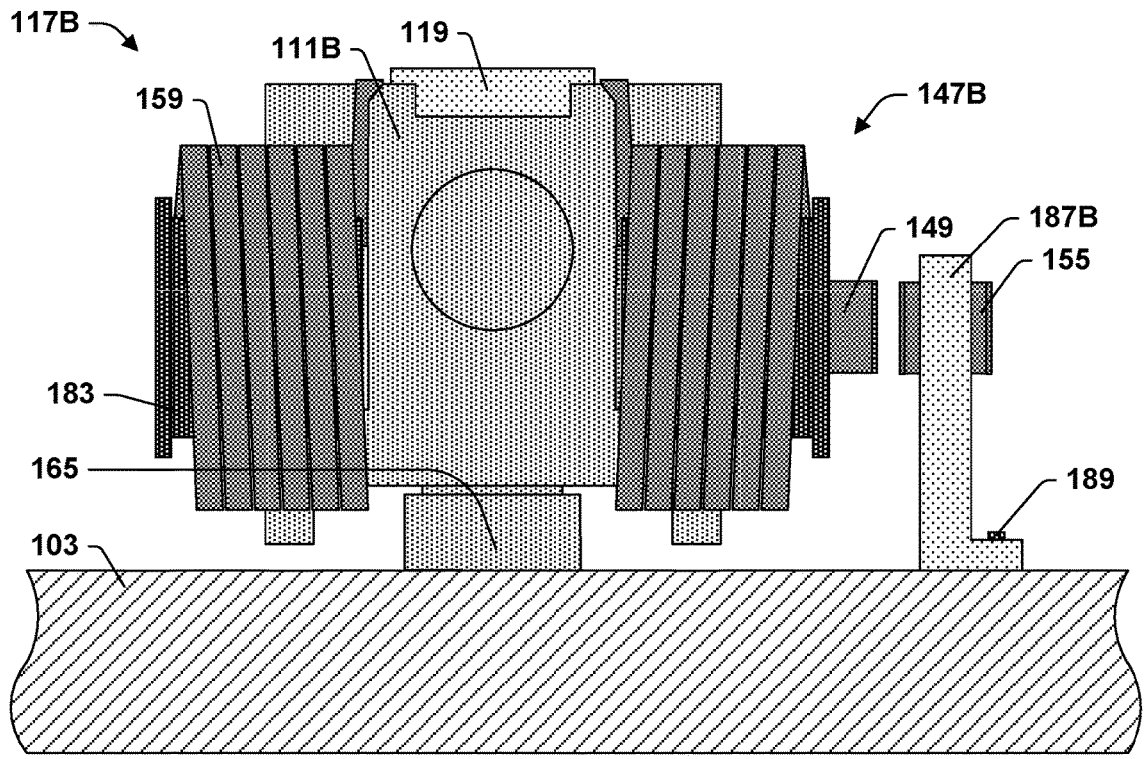
FIG. 9 is a rear view of the internal combustion engine of FIG. 8.
Figure 10:
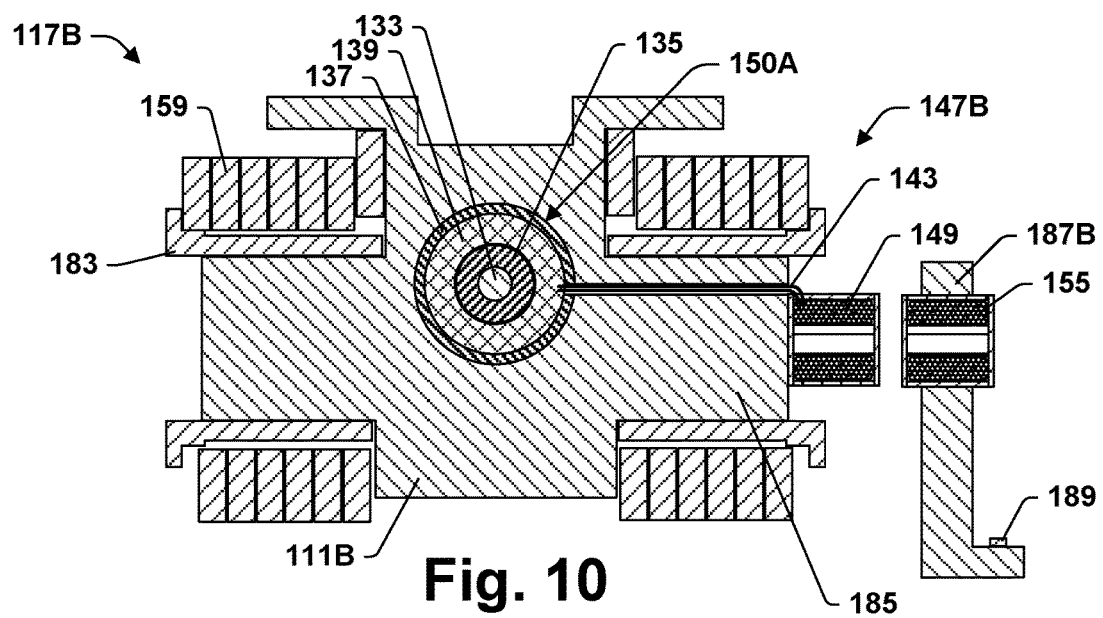
FIG. 10 is cross-sectional view of the rocker arm assembly of the internal combustion engine of FIG. 8 taken along line 10-10 of FIG. 8.

The present teachings are applicable to other types of rocker arm assemblies in which energizing solenoid 139A does not limit the motion of the rocker arm 111 to which coil 149 is mounted. FIGS. 8-10 illustrate an internal combustion engine 117B in which coils 149 and 155 are mounted to undergo relatively little motion even as outer arm 111B to which coil 149 is mounted pivots on HLA 165. In this example coil 149 is mounted proximate the axis on which outer arm 111B pivots, which may run through spring posts 185. In fact, coil 149 may be mounted directly to a spring post 185. Torsion springs 159 may be mounted on hubs 183 that fit over spring posts 185. Coil 149 may pivot relative to coil 155 due to motion of outer arm 111B. The effect of that pivoting on inductive coupling between coils 149 and 155 may be negligible.

In engine 117B, coil 155 is supported by a mounting frame 187B, which may be held by a blot 189 to cylinder head 103. This configuration securely holds coil 155, but may require an extra bore within cylinder head 103. Mounting to a cam carrier (not shown) avoids the extra bore and is one way in which the mounting of coil 155 may be provided together with the rest of valvetrain 115B.

Figure 11:
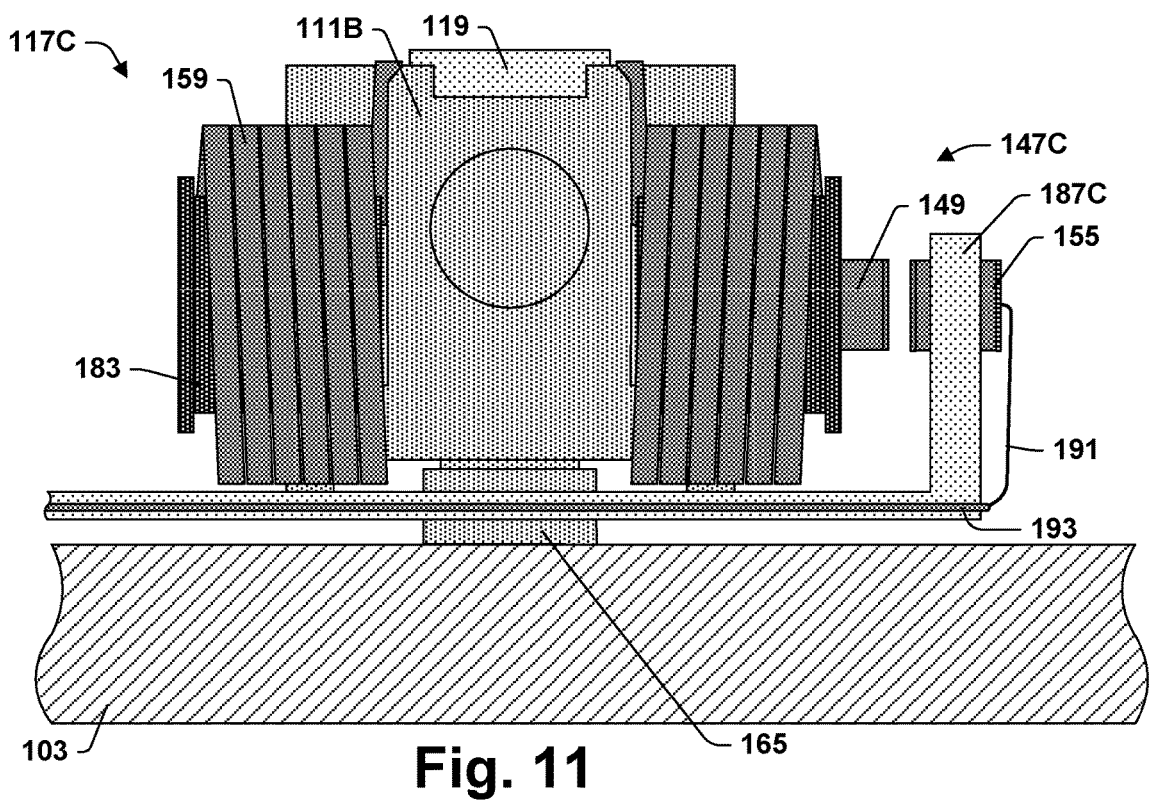
FIG. 11 provides a rear view of a portion of an internal combustion engine according to some other aspects of the present teachings and corresponds to the view along line 11-11 of FIG. 13.

FIG. 11 illustrates an internal combustion engine 117C having a rocker arm assembly 147C that include an outer arm 111B to which coil 149 is mounted and a mounting frame 187C that holds coil 155. Mounting frame 187C is carried by a portion of rocker arm assembly 147C that may undergo relatively little motion relative to cylinder head 103. In particular, mounting frame 187C may attach coil 155 to HLA 165. Securing mounting frame 187C to a part of rocker arm assembly 147C such as HLA 165 may facilitate controlling the spacing between coils 149 and 155.

Figure 12:
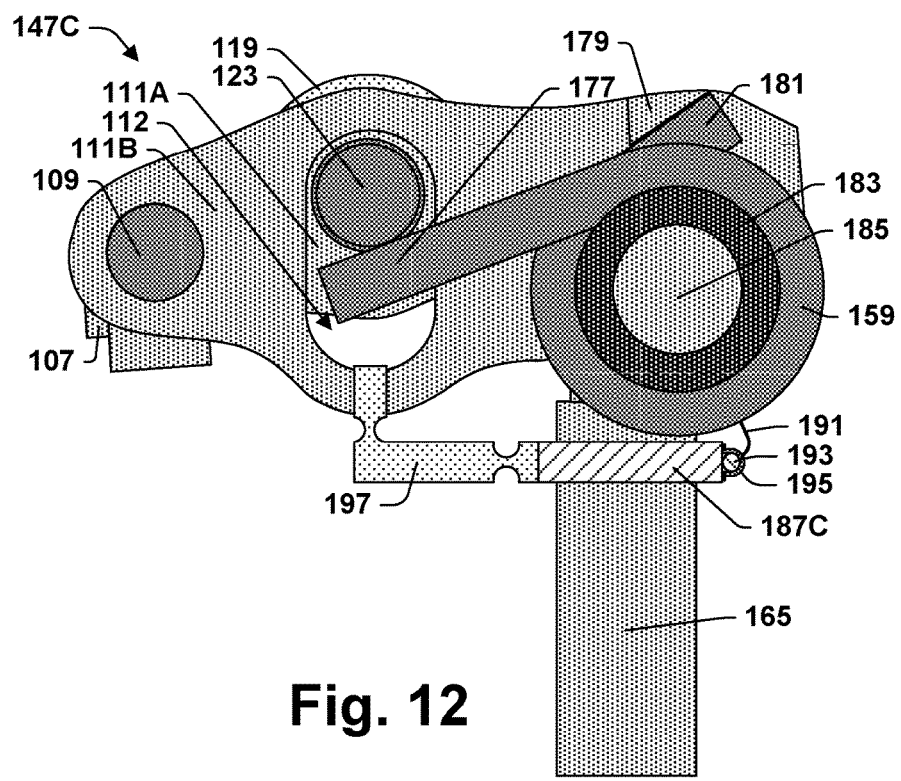
FIG. 12 provides a side view of a rocker arm assembly for the internal combustion engine of FIG. 11 and corresponds to the view along line 12-12 of FIG. 13.

Another advantage of securing coil 155 to rocker arm assembly 147C is that it facilitates installation of a rocker arm assembly 147C along with a system for powering electromagnetic latch assemblies 150A. Additional utility may be gained by securing HLA 165 to rocker arms 111 prior to installation. FIG. 12 shows rocker arm assembly 147C with a temporary connector 197 that may be used for this purpose. Connector 197 may be joined to mounting frame 187C or independently mounted to HLA 165. Connector 197 may be a breakaway connector that is adapted to be easily torn off after installation of rocker arm assembly 147C in cylinder head 103.

Figure 13:
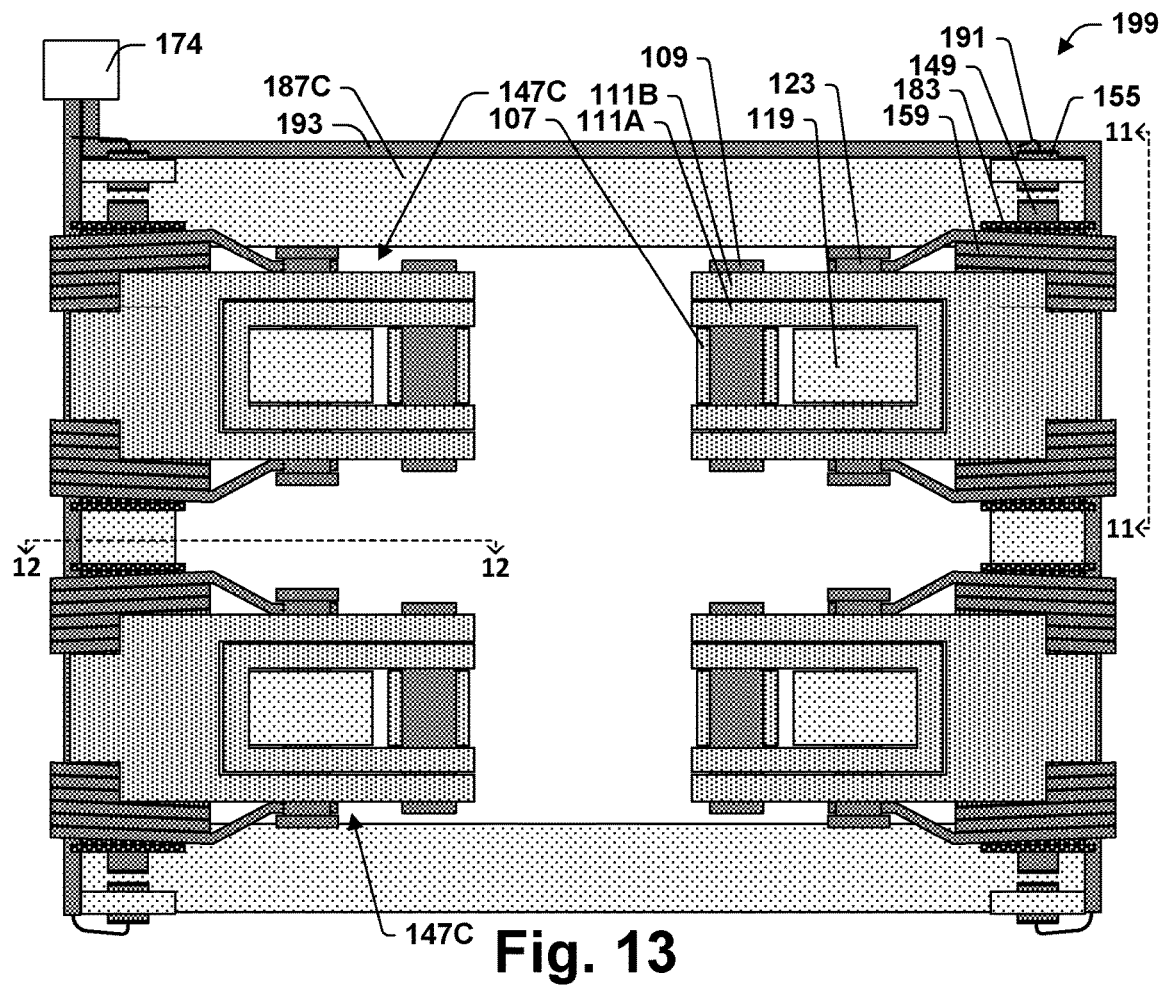
FIG. 13 illustrates a valve actuation module according to some aspects of the present teachings.

Mounting frame 187C may extend to encompass a plurality of rocker arm assemblies 147C as shown in FIG. 13. The overall structure may be referred to as a valve actuation module 199. Forming valve actuation module 199 may facilitate the installation of a plurality of rocker arm assemblies 147C in cylinder head 103 with a single operation. A wiring harness 193 may also be attached to mounting frame 187C, using connectors 195 as shown in FIG. 11 for example. Wiring harness 193 may carry wires supplying power to a plurality of coils 155. Wiring harness 193 may provide a single plug 174 through which the plurality of coils 155 may be connected to an electrical system of internal combustion engine 117C.

Figure 14:
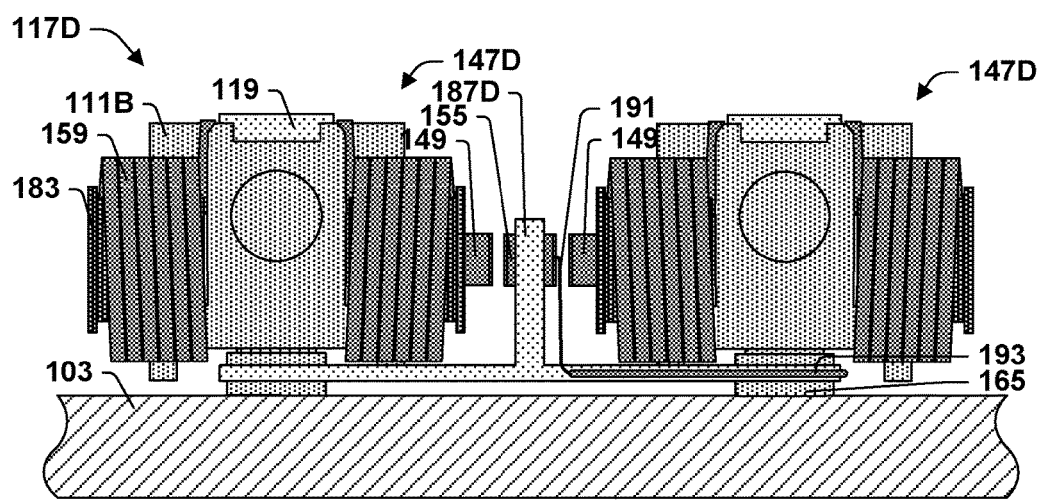
FIG. 14 provides a rear view of a portion of an internal combustion engine according to some other aspects of the present teachings.

In the examples provided thus far, one coil 155 that is not attached to any rocker arm is provided for each coil 149 attached to a rocker arm. FIG. 14 provides an example of an engine 117D in which a coil 155 is positioned to power two coils 149, each mounted to an outer arm 111B in one of two adjacent rocker arm assemblies 147D. Coil 155 may be held in position by a mounting frame 187D. Mounting frame 187D may be attached to HLA's 165 of two adjacent rocker arm assemblies 147D.

With reference to FIG. 1, hydraulic lash adjuster (HLA) 165 may include an inner sleeve 161 and an outer sleeve 163. Hydraulic lash adjuster 165 may be replaced by another type of lash adjuster or by a static fulcrum. Lash adjustment may be implemented using a hydraulic chamber 175 that is configured to vary in volume as hydraulic lash adjuster 165 extends or contracts through relative motion of inner sleeve 161 and outer sleeve 163. A supply port 170 may allow a reservoir chamber 172 to be filled from an oil gallery 168 in cylinder head 103. The fluid may be engine oil, which may be supplied at a pressure of about 2 atm. When cam 127 is on base circle, this pressure may be sufficient to open check valve 173, which admits oil into hydraulic chamber 175. The oil may fill hydraulic chamber 175, extending hydraulic lash adjuster 165 until there is no lash between cam 127, rocker arm assembly 147A, and valve 106. As cam 127 rises off base circle, hydraulic lash adjuster 165 may be compressed, pressure in hydraulic chamber 175 may rise, and check valve 173 may consequently close.

The example internal combustion engines 117 illustrated herein all have end pivot overhead cam (OHC) type valvetrains 115. But some of the present teaching are applicable to internal combustion engines having other types of valvetrains including, for example, other types of OHC valvetrains and overhead valve (OHV) valvetrains that may include rocker arm assemblies that are latched. The rocker arm assemblies 106 illustrated herein are all cylinder deactivating rocker arms. But some of the present teaching are applicable to switching rocker arms and other types of rocker arm assemblies.

A mounting frame 187 may attach to the outer sleeve 163 of an HLA 165. If a mounting frame 187 is attached to only a single HLA 165, there may be some special provision to prevent mounting frame 187 from rotating. One option is to provide outer sleeve 163 with an anti-rotation guide. Inner sleeve 161 may still be allowed to rotate within outer sleeve 163 to reduce uneven wear at the interface with outer arm 111B. Another option is to extend the mounting frame 187 to contact two or more HLAs 165, as does mounting frame 187D of FIG. 14.

Figure 15:
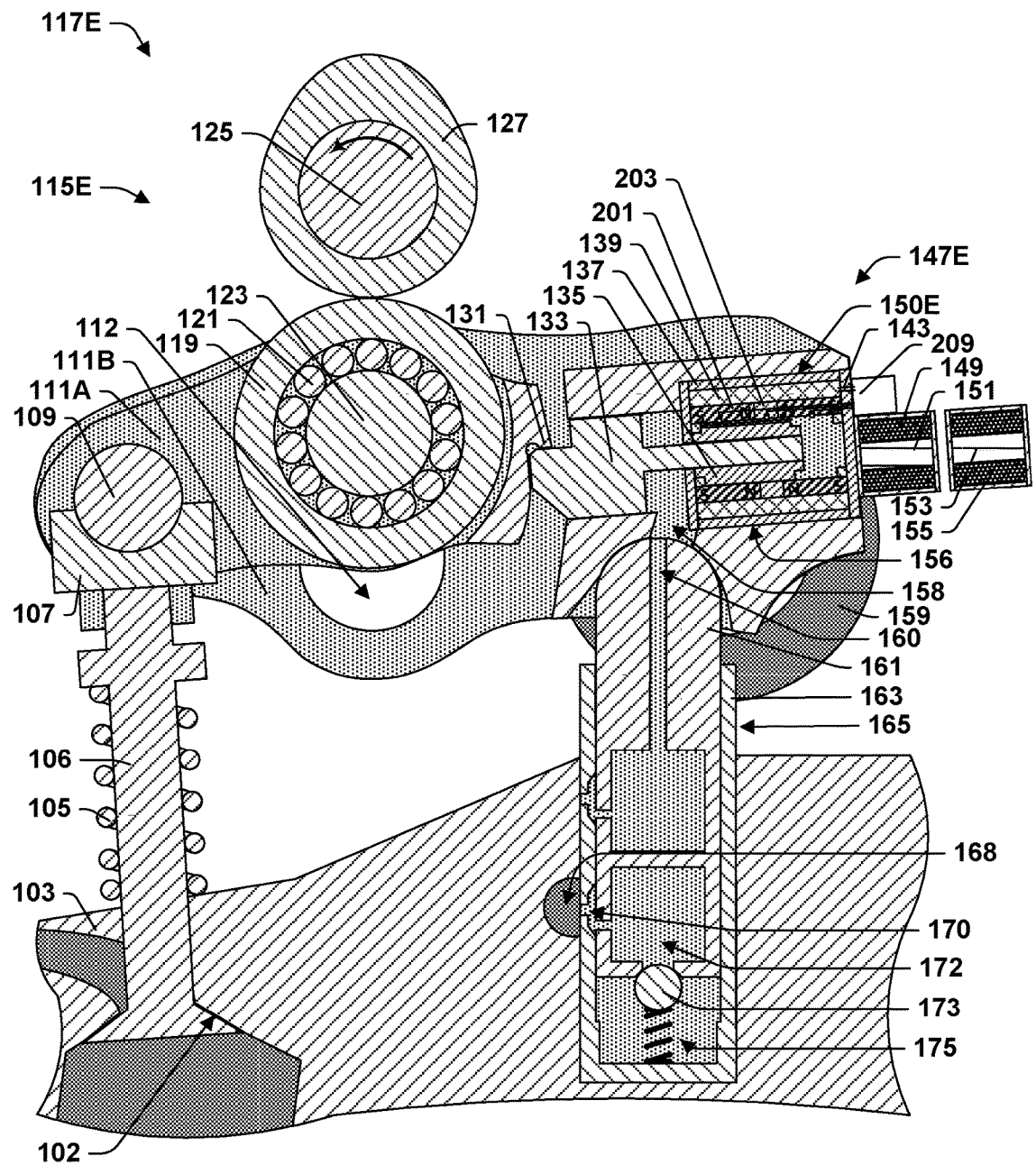
FIG. 15 is a cross-sectional side view of a portion of an internal combustion according to some aspects of the present teachings.

FIG. 15 illustrates an internal combustion engine 117E having a valvetrain 115F that includes a rocker arm assembly 147E. Rocker arm assembly 147E includes an outer arm 111B within which there is installed an electromagnetic latch assembly 150E. Electromagnetic latch assembly 150E includes two annular permanent magnets 201A and 201B positioned within solenoid 139 with confronting polarities and with a low coercivity ferromagnetic ring 203 between them. Permanent magnets may be rigidly mounted with respect to solenoid 139 and outer arm 111B.

Electromagnetic latch assembly 150E is bi-stable in that it provides both extended and retracted positions in which latch pin 133 is stable independently from solenoid 139. As a consequence, either the latched or unlatched configuration can be reliably maintained without solenoid 139 being powered. Positional stability refers to the tendency of latch pin 133 to remain in and return to a particular position. Stability is provided by restorative forces that act against small perturbations of latch pin 133 from a stable position. In accordance with some of the present teachings, stabilizing forces are provided by permanent magnets 201. Alternatively or in addition, one or more springs may be positioned to provide positional stability. Springs may also be used to bias latch pin 133 out of a stable position, which may be useful for increasing actuation speed.

Figure 16:
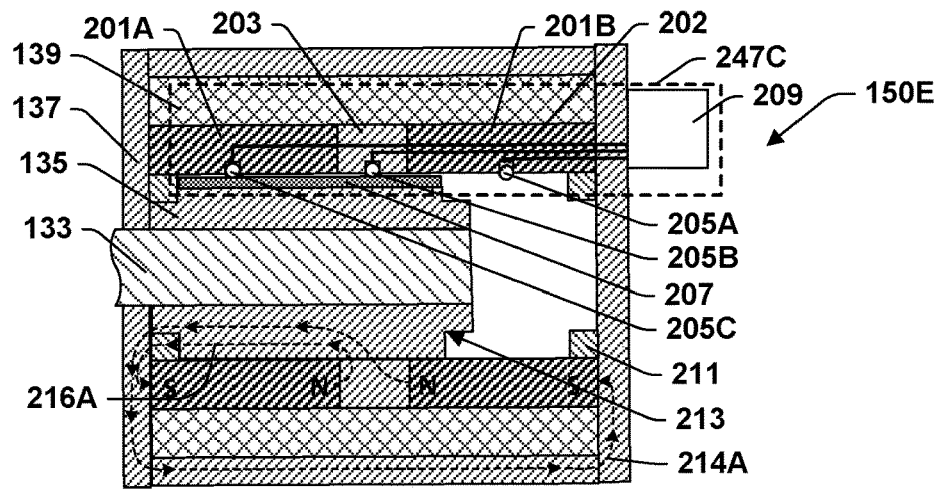
FIG. 16 is a cross-sectional side view of an electromagnetic latch assembly used in the internal combustion engine of FIG. 15 with the latch pin in an extended position.
Figure 17:
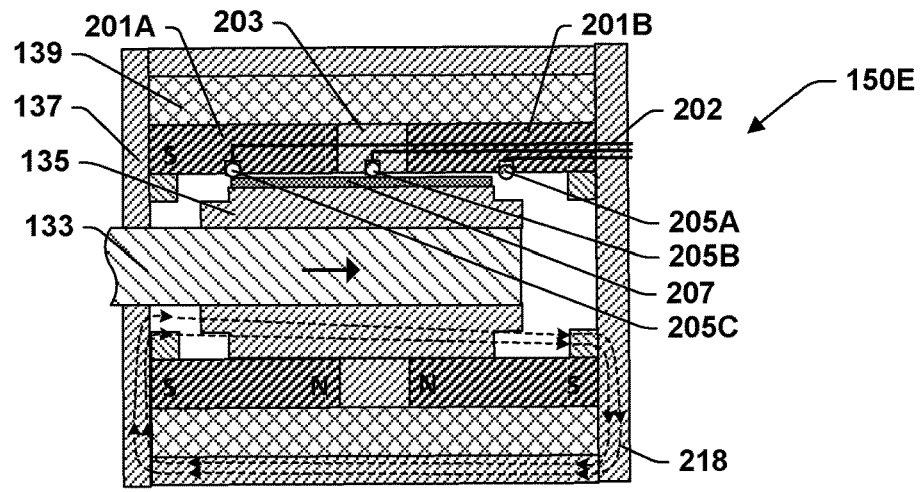
FIG. 17 is a cross-sectional side view of an electromagnetic latch assembly used in the internal combustion engine of FIG. 15 with the solenoid energized and the latch pin in a transitional state.
Figure 18:
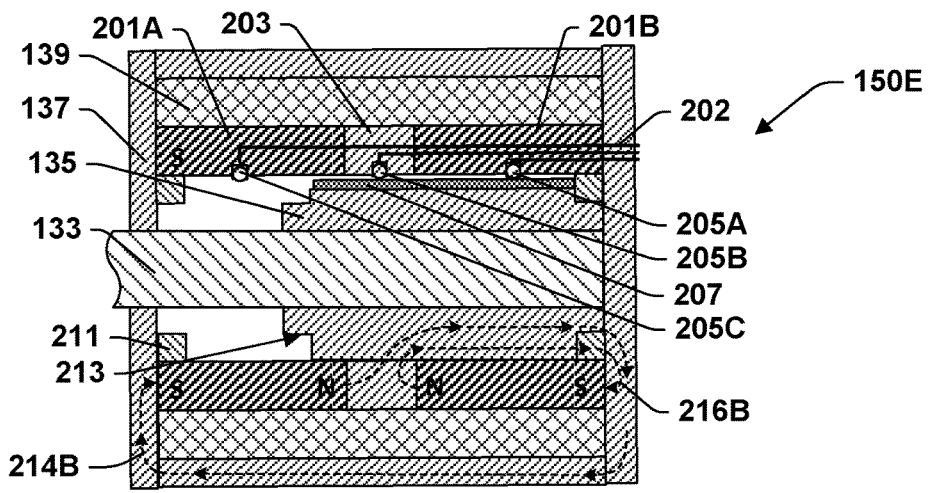
FIG. 18 is a cross-sectional side view of an electromagnetic latch assembly used in the internal combustion engine of FIG. 15 with the latch pin in a retracted position.

FIGS. 16-18 illustrate the operation of electromagnetic latch assembly 150E. FIG. 16 shows electromagnetic latch assembly 150E with latch pin 133 in the extended position. FIG. 18 shows electromagnetic latch assembly 150E with latch pin 133 in the retracted position. In FIGS. 16 and 18, solenoid 139 is de-energized. FIG. 17 illustrated latch pin 133 in a transitional state with solenoid 139 energized and driving latch pin 133.

Electromagnetic latch assembly 150E may include various low coercivity ferromagnetic elements that are operative as pole pieces and positioned to form magnetic circuits for flux from permanent magnets 201. These include pieces 137 forming a shell around solenoid 139 and annular rings 211. Annular rings 211 may be shaped to mate with stepped edges of low coercivity ferromagnetic ring 135 mounted to latch pin 133. During actuation, magnetic flux may cross an air gap between one of these stepped edge and a mating ring 211, in which case the stepped edge may be operative to increase the magnetic forces through which latch pin 133 is actuated.

As shown in FIGS. 16 and 18, permanent magnet 201A stabilizes latch pin 133 in both the extended and the retracted positions. As shown in FIG. 6, magnetic circuit 216A is operative to be the primary path for magnet flux from permanent magnet 201A when latch pin 133 is in the extended position, absent magnetic fields from solenoid 139 or any external source that might alter the path taken by flux from permanent magnet 201A. Perturbation of latch pin 133 from the extended position would introduce an air gap into magnetic circuit 216A, increasing its magnetic reluctance. Therefore, the magnetic field produced by permanent magnet 201A resists such perturbations.

As shown in FIG. 18, magnetic circuit 214B is operative to be the primary path for magnet flux from permanent magnet 201A when latch pin 133 is in the retracted position, absent magnetic fields from solenoid 139 or any external source that might alter the path taken by flux from permanent magnet 216A. Perturbation of latch pin 133 from the retracted position would introduce an air gap into magnetic circuit 214B, increasing its magnetic reluctance. Therefore, the magnetic field produced by permanent magnet 201A resists those perturbations as well.

FIGS. 16 and 18 show that permanent magnet 201B also stabilizes the position of latch pin 133 in both the extended and retracted positions. In the extended position, magnetic flux from permanent magnet 201B primarily follows circuit 214A. In the retracted position, magnetic flux from permanent magnet 201B primarily follows circuit 216B.

Electromagnetic latch assembly 150E is structured to operate through a magnetic flux path-shifting mechanism. FIG. 17 illustrates this mechanism for the case in which solenoid 139 is operated to induce latch pin 133 to actuate from the extended position to the retracted position. A voltage of suitable polarity may be applied to solenoid 139 to induce magnetic flux following the circuit 218. The magnetic flux from solenoid 139 may reverse the magnetic polarity in low coercivity ferromagnetic elements forming the magnetic circuits 214A and 216A through which permanent magnets 201 stabilized latch pin 133 in the extended position. This greatly increases the reluctance of magnetic circuit 214A and 216A. Magnetic flux from permanent magnets 201 may thus be driven to shift from magnetic circuits 214A and 216A toward magnetic circuits 216B and 214B. The net magnetic forces on latch pin 133 may drive it to the retracted position shown in FIG. 18. The total air gap in the magnetic circuit 218 taken by flux from solenoid 139 may not vary significantly as latch pin 133 actuates. This feature relates to operability through a flux path-shifting mechanism.

Magnetic circuits 216A and 216B are short magnetic circuits between the poles of permanent magnets 201A and 201B respectively. Magnetic circuits 216 pass through low coercivity ferromagnetic portion 135 of latch pin 133 but not around the coils of solenoid 139. These short magnetic circuits may reduce magnetic flux leakage and allow permanent magnets 201 to provide a high holding force for latch pin 133. Magnetic circuits 214, on the other hand, pass around the coils of solenoid 139. Routing these magnetic circuits around the outside of solenoid 139 may keep them from interfering with the shorter magnetic circuits. These longer, alternate magnetic circuits can allow permanent magnets 201 to contribute to stabilizing latch pin 133 in both extended and retracted positions and can assure there is a low reluctance magnetic circuit to help maintain the polarization of permanent magnets 201 regardless of whether latch pin 133 is in the extended or the retracted position.

As used herein, a permanent magnet is a high coercivity ferromagnetic material with residual magnetism. A high coercivity means that the polarity of permanent magnet 201 remains unchanged through hundreds of operations through which electromagnetic latch assembly 150E is operated to switch latch pin 133 between the extended and retracted positions. Examples of high coercivity ferromagnetic materials include compositions of AlNiCo and NdFeB.

While permanent magnets 201 may initially hold latch pin 133 in a first position, at some point during latch pin 133's progress toward the second position, permanent magnets 201 begin to attract latch pin 133 toward the second position. Accordingly, at some point during latch pin 133's progress, solenoid 139 may be disconnected from its power source and latch pin 133 will still complete its travel to the second position. This feature may lend itself to coupling a switch that alter the polarity of voltage applied to solenoid 139 to the movement of latch pin 133.

Electromagnetic latch assembly 150A forms an air gap 140 shown in FIG. 2. Moving latch pin 133 toward the retracted position tends to reduce air gap 140, which reduces the magnetic reluctance in a path taken by flux from solenoid 139. As a consequence, in electromagnetic latch assembly 150A energizing solenoid 139 causes latch pin 133 to move toward the retracted position regardless of the direction of the current through solenoid 139 or the polarity of the resulting magnetic field. But in electromagnetic latch assembly 150E, latch pin 133 may be moved in either one direction or another depending on the polarity of the magnetic field generated by solenoid 139.

Figure 19:
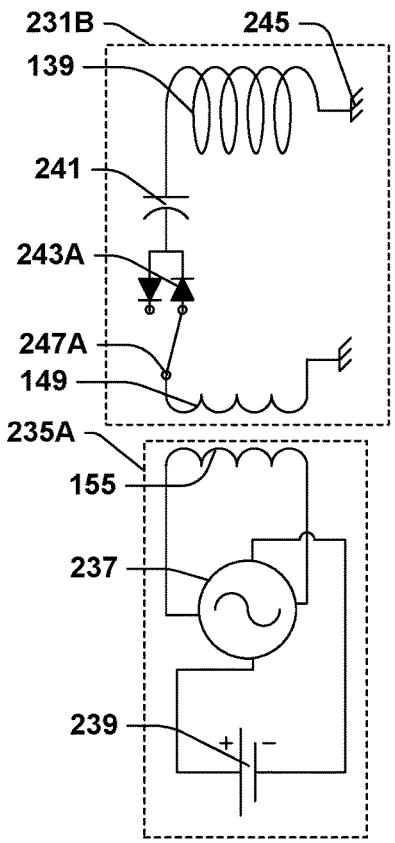
FIG. 19 is a diagram of first and second electrical circuits according to some other aspects of the present teachings.
Figure 20:
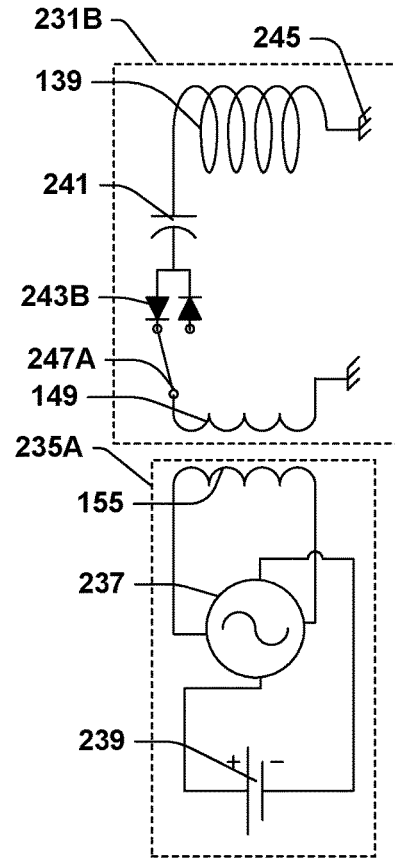
FIG. 20 illustrates the same electrical circuits as FIG. 19, but with the switch position changed.
Figure 22:
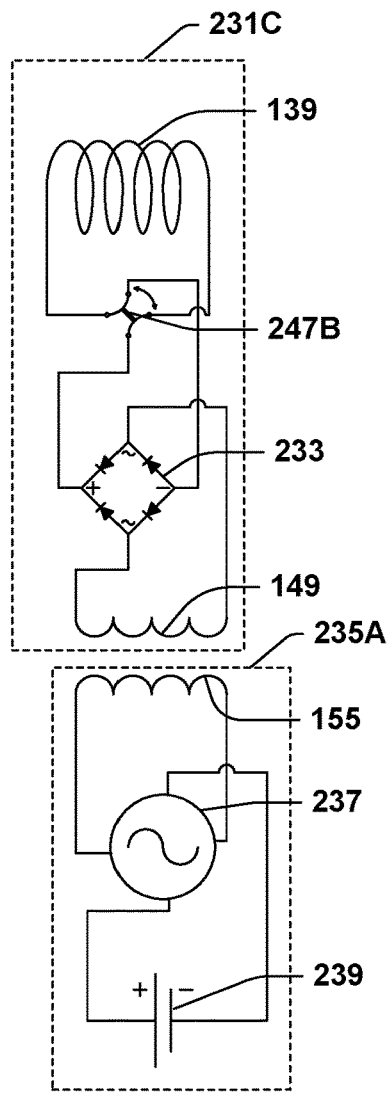
FIG. 22 is a diagram of first and second electrical circuits according to some other aspects of the present teachings.
Figure 23:
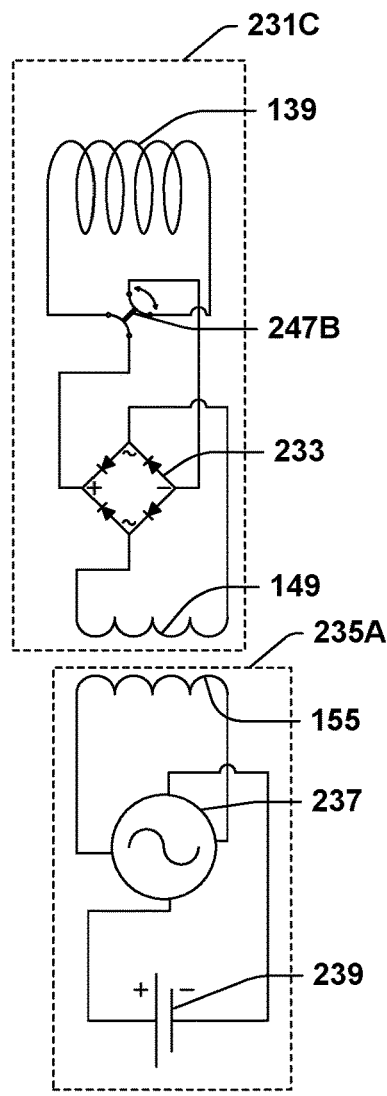
FIG. 23 illustrates the same electrical circuits as FIG. 22, but with the switch position changed.

A switch may be configured to vary the polarity of the magnetic field generated by solenoid 139. In some of these teachings, the switch is used to select between two rectifiers in a circuit connecting coil 149 to solenoid 139. FIGS. 19 and 20 provide an example in which a single-pole, double-throw switch 247A is configured in a circuit 231B to select between two half wave rectifier 243 positioned between coil 149 and solenoid 139. In some others of these teachings, the switch 247 is configured to select the polarity with which a DC voltage is applied to coil 139. FIGS. 22 and 23 provide an example in which a double-pole, double-throw switch 247B is configured in a circuit 231C to select between the polarity with which the output poles of full wave rectifier 233 are connected to the poles of solenoid 139. Alternatively, switch 247 may select which of two coil of solenoid 139 is powered. One of the coils may be wound in a first direction and the other may be wound in the opposite direction. One or the other set of coils may be energized depending on the position in which it is desired to place latch pin 133.

Switch 247 may be implemented with circuitry. But in some of these teachings, switch 247 is mechanical. A mechanical switch may be actuated by movement of the latch pin 133. With reference to FIG. 16, electromagnetic latch assembly 150E includes switch 247C, which is an example of such a switch. Switch 247C includes connectors 205, which may be spring loaded connectors. A conductive strip 207 with an insulated backing may be to mounted latch pin 133. Conductive strip 207 may be mounted to latch pin 133 through low coercivity ferromagnetic ring 135. Conductive strip 207 is of such a length that it will connect just two of the three wires 207 at any one time, depending on the position of latch pin 133. The identity of the pair of wires 207 that are connected determines the position of switch 247C.

Figure 21:
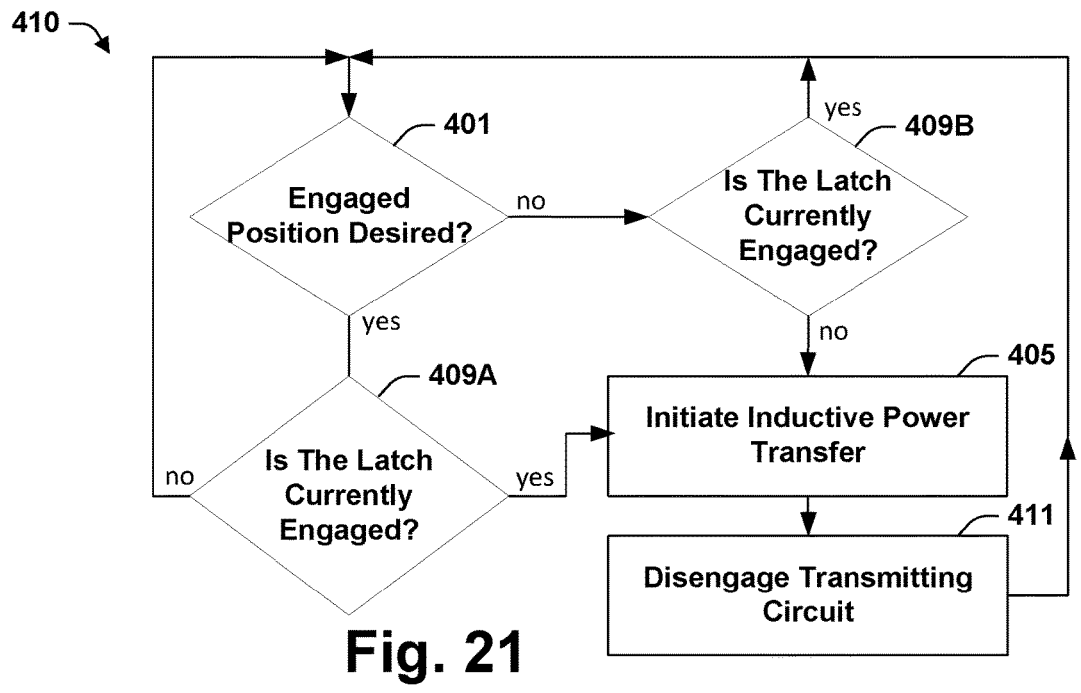
FIG. 21 is a flow chart for a method according to some other aspects of the present teachings.

FIG. 21 provides a flow chart for a method 410 for operating engine 117E or the like using the switch 247C or any other switch that automatically toggles each time electromagnetic latch assembly 150E is actuated. Method 410 begin with act 401, determining whether the engaging position is desired for latch pin 133. Method 410 continues with an act 409 of determining whether latch pin 133 is currently in the engaging position. This may be implemented with software that tracks the position of latch pin 133. In some of these teachings, however, a mechanism is provided to determine the current position of latch pin 133. Any suitable mechanism may be used to determine the current position of latch pin 133.

According to a further teaching of the present disclosure, measurements of voltage, current, resistance, or impedance in circuit 235A or other circuit that includes coil 155 are made and the measurements used to determine the position of latch pin 133. The impedance of coil 155 may vary with the position of coil 149. The position of coil 149 may vary in relation to the phase of cam shaft 125 in a way that depends on the position of latch pin 133. Coil 155 may be pulsed one or more times over the cam cycle with a current too short in magnitude or duration to actuate latch pin 133 in order to gather the desired data.

If the desired position for latch pin 133 is not the same as its current position, method 410 continues with act 405, energizing coil 155 to power circuit 231 and solenoid 139 causing latch pin 133 to actuate. As can be seen from FIG. 17, at some point over the course of actuation, switch 247C may open. With act 411, method 410 may disengage power transmission at approximately this point in time. Act 411 may operate by estimating the time required for actuation of latch pin 133. Electronic module 209 may include circuitry to delay engagement of switch 247C with reverse polarity in order to increase the time window before continued powering of coil 155 results in the polarity of voltage applied to solenoid 139 being reversed. Regardless, there may be a period over which no pair of wires 202 is connected. During this period, the impedance of coil 149 and therefore coil 155 may be altered. That variation may be detected by monitoring a voltage or current in circuit 235. In some of these teaching, circuit 235 is so monitored and power disengaged accordingly.

Even with optimal timing, power to solenoid 139 may be interrupted before latch pin 133 completes its translation from one position to the other. Nevertheless, translation in the desired direction may be expected to complete. By the time solenoid 133 has reached the half way point, the polarity in shell 137 and other components of magnetic circuits 214 and 216 has been reversed and translation may complete under the action of magnets 201.

Figure 25:
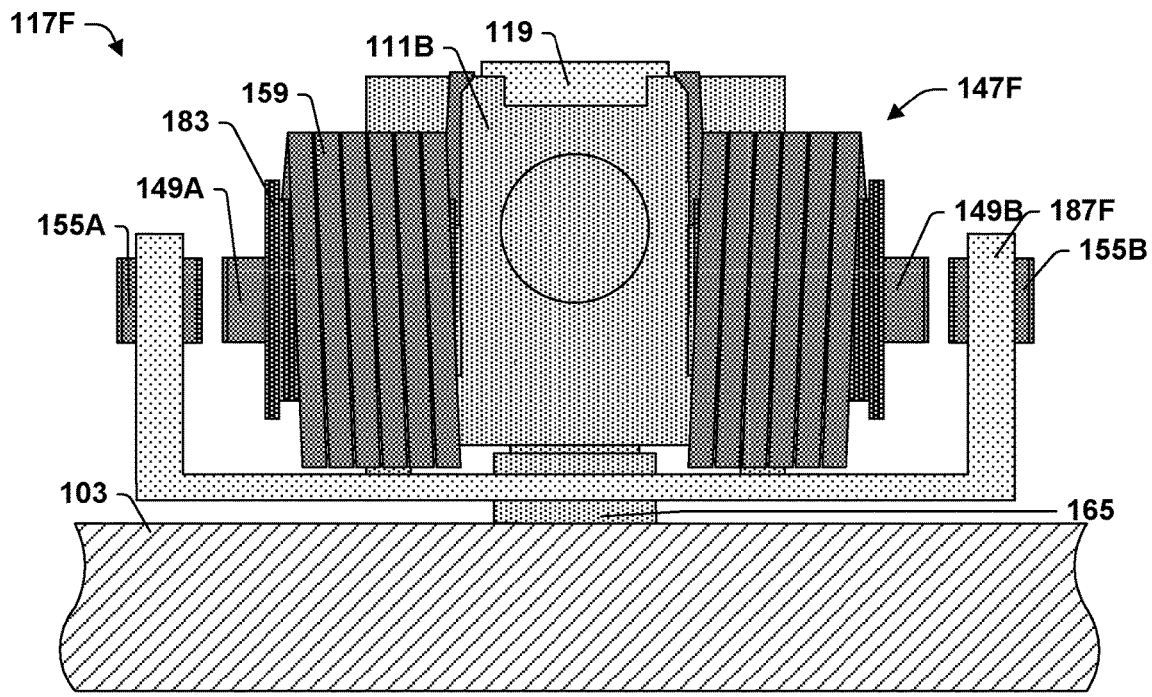
FIG. 25 provides a rear view of a portion of an internal combustion engine according to some other aspects of the present teachings.

Another way of selectively providing voltage with one of two polarities to solenoid 139 is to use two power sources. FIG. 25 illustrates an internal combustion engine 117F providing an example. Internal combustion engine 117F include a rocker arm assembly 147F with two coils 149A and 149B mounted to outer arm 111B. Each of the coils 149 is inductively coupled with a coil 155 mounted off rocker arms 111. In some of these teachings, one of the coils 149 powers a solenoid 139 in a circuit 231 while the other of the coils 149 controls a switch 247 that is configured to determine the polarity of the magnetic field generated by solenoid 139.

Figure 26:
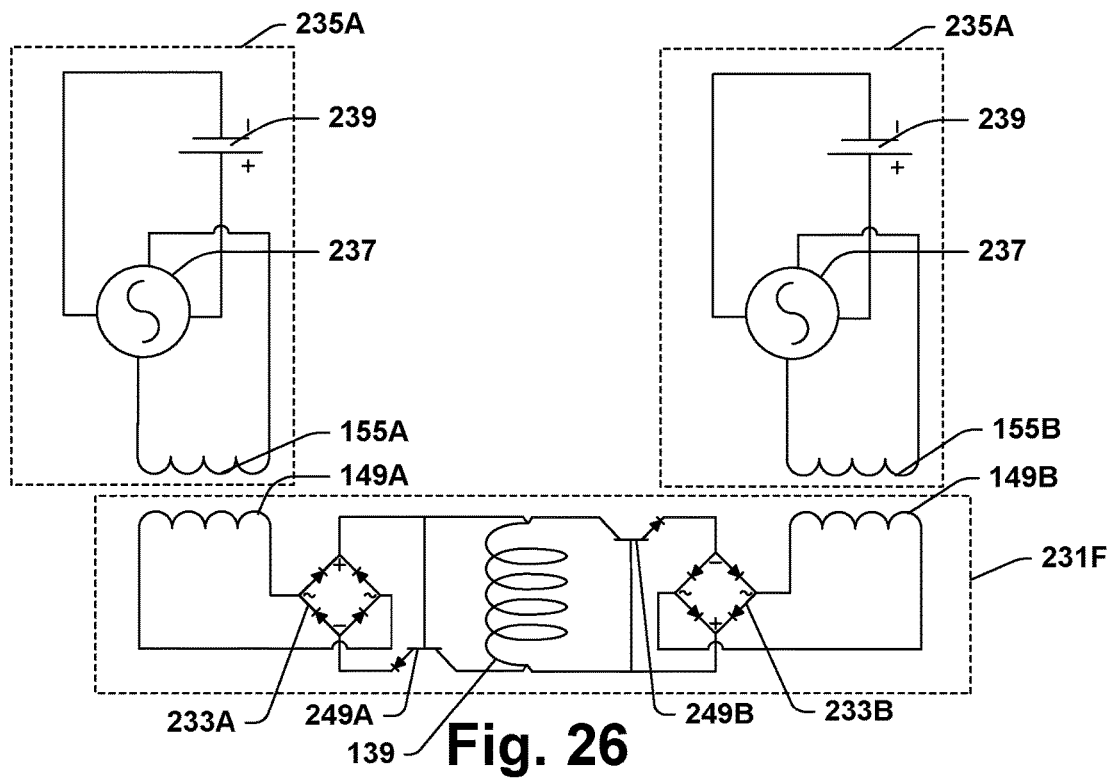
FIG. 26 is a diagram of electrical circuits according to some other aspects of the present teachings.

In some other of these teachings, one of the coils 149 is configured to extend latch pin 133 and the other to retract latch pin 133. FIG. 26 provides a diagram for circuits 235A and 231F that may be used for this purpose. In circuit 231F, full wave rectifier 233A may be configured to supply DC voltage to solenoid 139 with a first polarity when coil 149A is driven with an AC current. Full wave rectifier 233B may be configured to supply DC voltage to solenoid 139 with a reverse of the first polarity when coil 149B is driven with an AC current. Transistors 249 may be configured to prevent shorting around solenoid 139 when one or the other of the coils 149 is driven.

Figure 24:
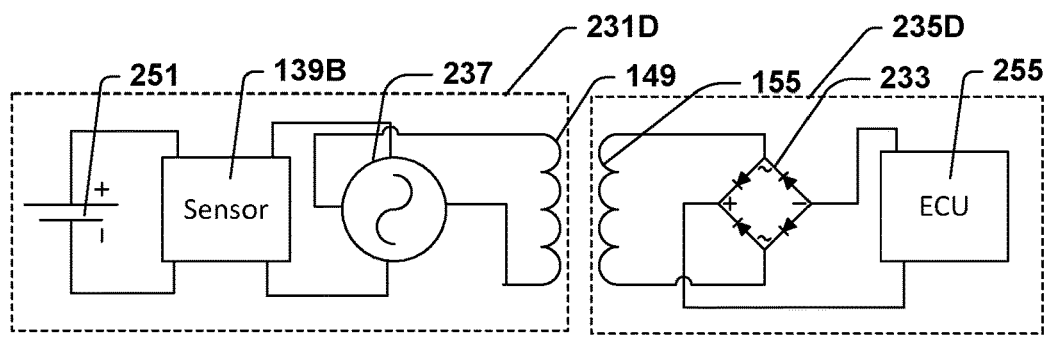
FIG. 24 is a diagram of first and second electrical circuits according to some other aspects of the present teachings.

Inductively coupled coils 149 and 155 as described herein may also be used for communication between an electrical device 139 mounted to a rocker arm 111 and a controller mounted off the rocker arm. FIG. 24 provides an example in which a sensor 139B communicates with an engine control unit (ECU) 255. In some of these teachings, sensor 139B produces an AC current output that is used to drive coil 149. In some of these teachings, sensor 139B produces a DC output that is used to drive an oscillator 237, which in turn drives coil 149. In some of these teachings, a switch that controls the driving of coil 149 from a power source 251 is controlled from the output of sensor 139B. Coil 149 may drive coil 155. The output of coil 155 may be processed and conveyed to ECU 255. In some alternative teachings, sensor 139B is configured in a circuit that varies the impedance of coil 149 according to the sensor 139B's output. The impedance of coil 149 may be queried by ECU 255. For example, ECU 255 may pulse coil 155 and sample the response in circuit 235D.

Sensor 139B may be powered in any suitable manner. In some of these teachings, sensor 139B itself may be operative to generate power. For example, sensor 139B may be an accelerometer that generates power when a rocker arm 111 to which sensor 139B is mounted accelerates. In some of these teachings, power source 251 is mounted to rocker arm assembly 147, is separate from sensor 139B, and is configured to generate power from motion of rocker arm assembly 147. In some of these teachings, a generator 251 is a piezoelectric generator. In some of these teachings, a generator 251 is an electromagnetic generator. In some of these teachings, a generator 251 is configured to generate power from vibrations of rocker arm assembly 147. In some of these teachings, a generator 251 is configured within a force transmission pathway of rocker arm assembly 147 or is otherwise configured to be driven by a cam 127. Alternatively, power source 251 may be an energy storage device such as a battery or capacitor. In some of these teachings, an energy source 251 is charged from energy inductively transferred from a coil 155 off rocker arm 111 to a coil 149 mounted on the rocker arm 111. An additional pair of inductively coupled coils 149 and 155 may be provide to power a circuit 231D including sensor 139B.

In accordance with some aspects of the present teachings, magnetic components of an electromagnetic latch assembly 150 are mounted within a chamber 156 formed in outer arm 111B. The magnetic component housed in chamber 126 may include solenoid 139, permanent magnets 201, or both. In accordance with some of these teachings, chamber 126 is sealed against intrusion from metal particles that may be in oil dispersed throughout the surrounding rocker arm assembly 106.

In accordance with some aspects of the present teachings, chamber 156 is a hydraulic chamber. Chamber 156 may have been adapted to house parts of electromagnetic latch assembly 150. In accordance with some of these teachings, rocker arm assembly 106 is made using rocker arms 111 put into production for use with a hydraulically actuated latch. In accordance with some of these teachings, an electric latch assembly 150 has been installed in place of a hydraulic latch. While chamber 156 is a hydraulic chamber, it need not be functionally connected to a hydraulic system. A hydraulic passage 158 may connect to chamber 156. Hydraulic passage 158 may be blocked to help seal chamber 156. In some of these teaching, hydraulic passage 158 couples with a hydraulic passage 160 formed in hydraulic lash adjuster 165.

In accordance with some aspects of the present teachings, hydraulic lash adjuster 165 may have been originally designed for use with a hydraulically latching rocker arm assembly. Accordingly, a second supply port 166 may be formed in hydraulic lash adjuster 165 and communicate with a second reservoir chamber 167 in hydraulic lash adjuster 165. Cylinder head 103 may not include any provision for supplying oil to second supply port 161. Second reservoir chamber 167 may be isolated from any substantial flow of hydraulic fluid in cylinder head 103. Reservoir chamber 167 and hydraulic passages communicating therewith may be essentially non-functional in engine 117.

Figure 27:
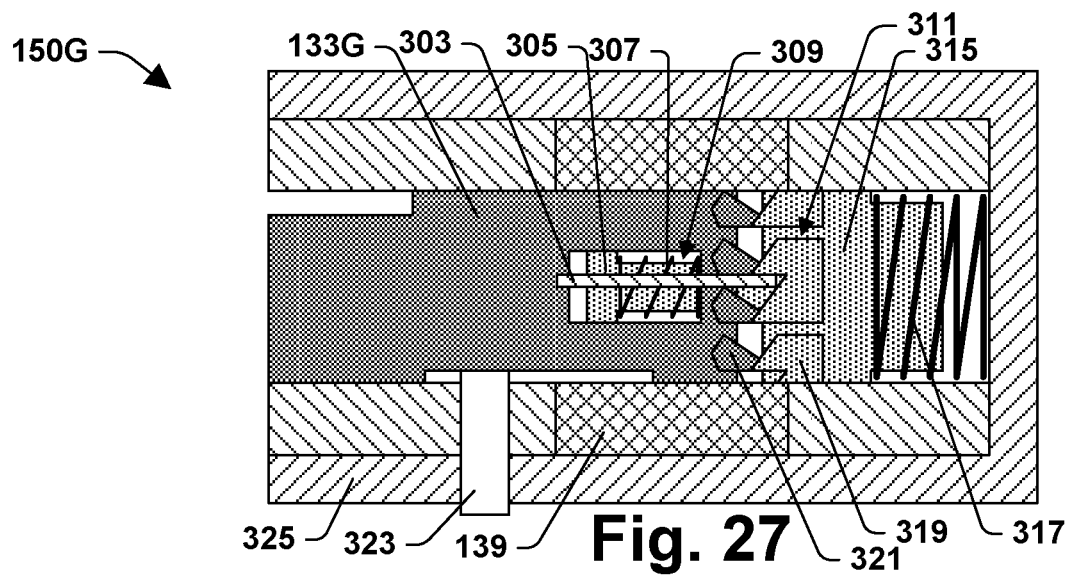
FIG. 27 illustrates a latch according to some aspects of the present teachings with the latch pin in a retracted position.
Figure 28:
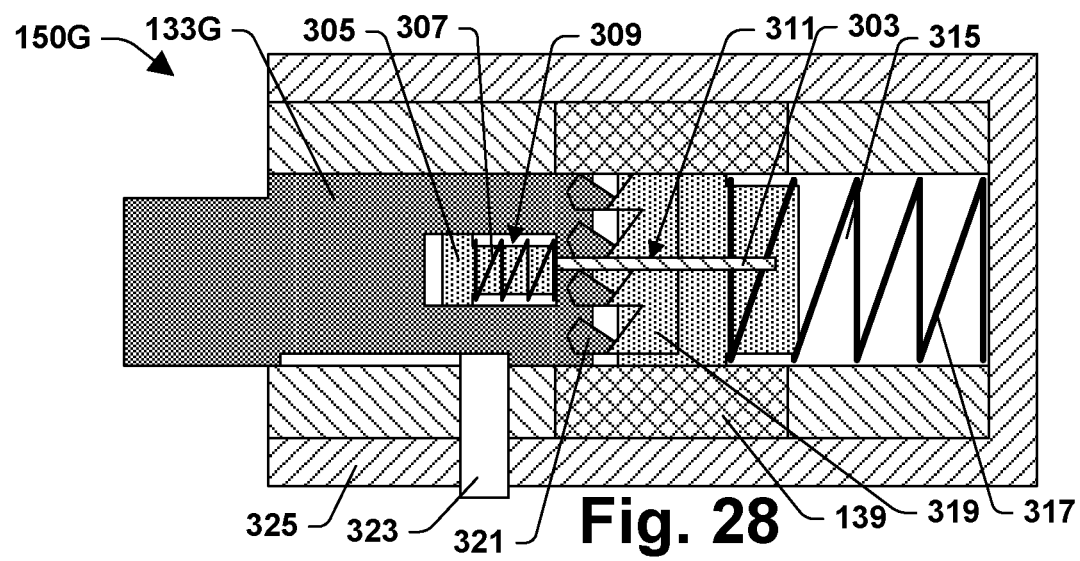
FIG. 28 illustrates the latch of FIG. 27 with the latch pin in an extended position.

Electromagnetic latch assembly 150G of FIGS. 27-31 provides an example in which both the extended and retracted positions are stabilized by springs. Electromagnetic latch assembly 150G is operative to toggle between the retracted and the extended positions in response to repeated application of a force in one direction using solenoid 139, which may be powered as described elsewhere herein. Electromagnetic latch assembly 150G may include a cam 315 configured to rotate in response to a translation of latch pin 133G. In the illustrated design, latch pin 133G is operative as a cam follower. Latch pin 133G may include teeth 321 that interface with teeth 319 of cam 315. Teeth 319 and 321 may be arranged radially about perimeters of latch pin 133G and cam 315 respectively. One or more fins 303 may extend from solenoid 139 or another member fixedly positioned with respect to latch pin housing 325 and fit between teeth 319, constraining the rotation of latch pin 133, FIG. 27 provides a partial cutaway top view showing electromagnetic latch assembly 150G in its retracted position. FIG. 28 provides a similar view showing electromagnetic latch assembly 150G in its extended position. Plunger 305, which is an extension of cam 315, may extend into a chamber 309 formed centrally within latch pin 133G and may be retained there by a spring 307. In both the retracted an extended positions, latch pin 133G and cam 315 may be held in abutment by spring 307. In the retracted position, motion of cam 315 to the left may be prevented by interference between cam teeth 319 and fin 303. Latch pin 133G may be susceptible to displacement slightly to the left relative to cam 315. This motion may be restricted and countered by spring 307. Displacing latch pin 133G to the right may also displace cam 315, which collective motion may be resisted and countered by spring 317. Latch pin 133G may thus be stabilized in the retracted position by springs 317 and 307. A portion of cam 315 abutting spring 317 may be formed as a separate part from the main body of cam 315 to facilitate rotation of cam 315.

In the extended position, shown by FIG. 28, fin 303 has slipped through an opening 311 between cam teeth 319. Displacement of latch pin 133G to the left from this position may be prevented by orientation pin 323. Displacement of latch pin 133G to the right may also displaces cam 315, which collective motion may be resisted and countered by spring 317. Latch pin 133G may thus be stabilized in the extended position by spring 317.

Figure 29:
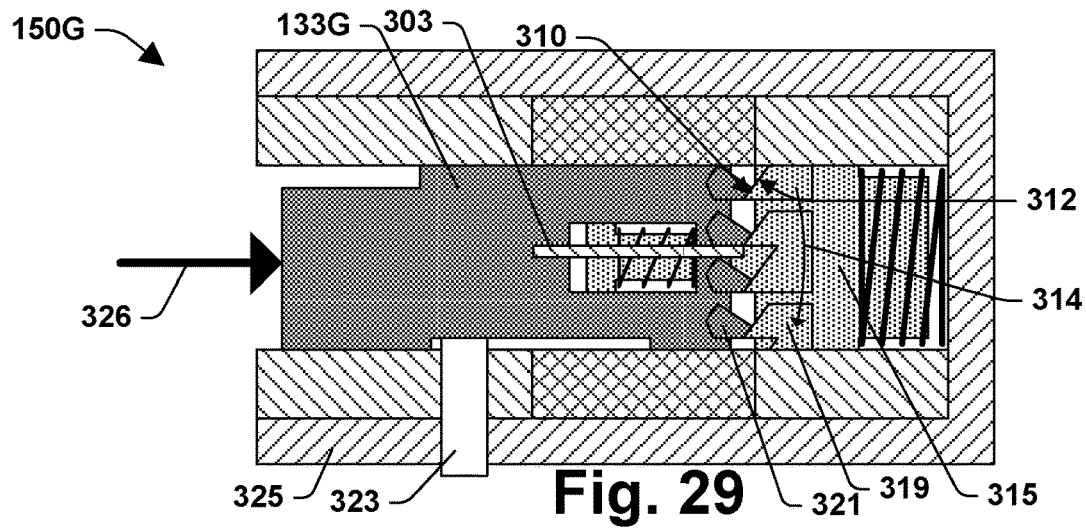
FIG. 29 illustrates the latch of FIG. 27 in a first transitional state.
Figure 30:
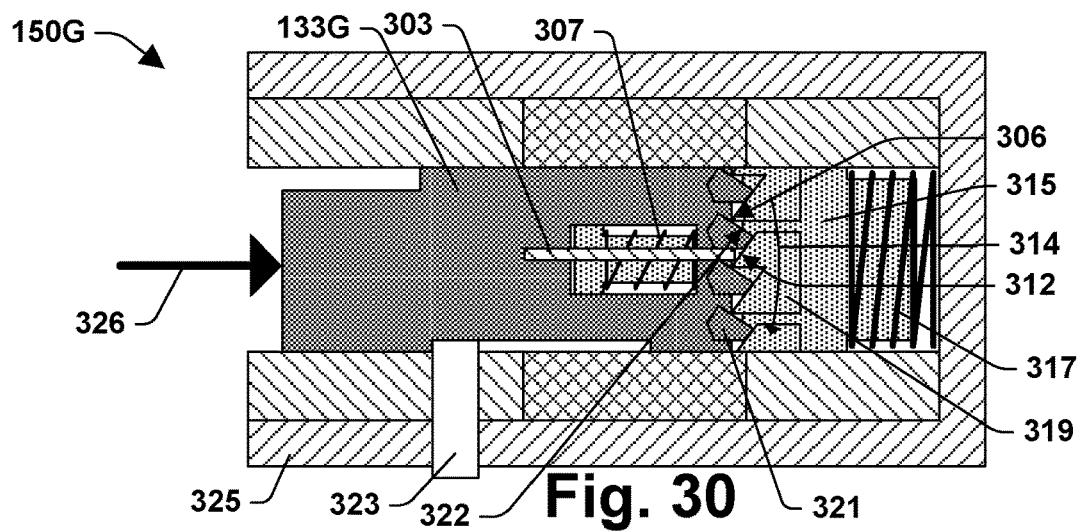
FIG. 30 illustrates the latch of FIG. 27 in a second transitional state.
Figure 31:
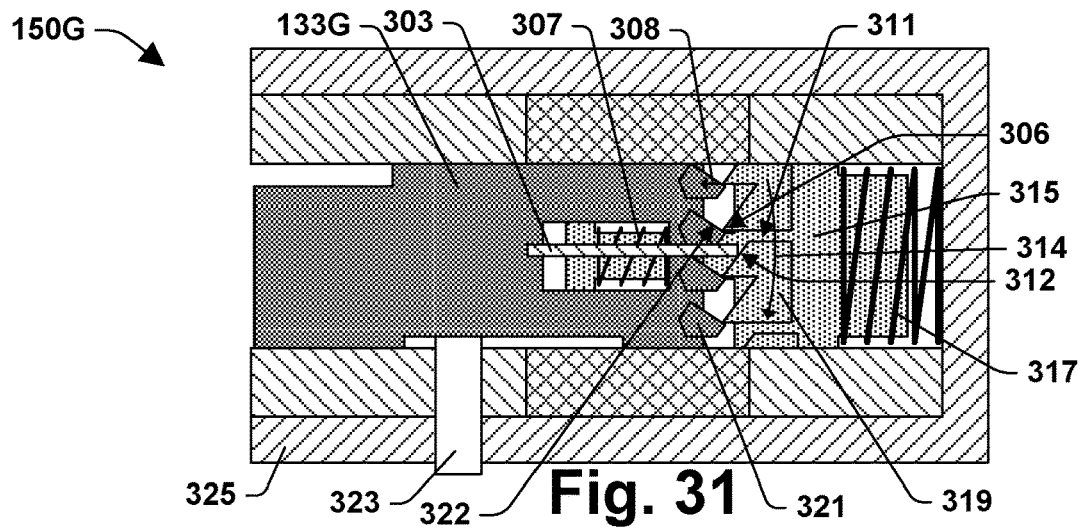
FIG. 31 illustrates the latch of FIG. 27 in a third transitional state.

FIGS. 29-31 show electromagnetic latch assembly 150G at intermediate stages in a process of actuating to transition latch pin 133G from the retracted to the extend position. Essentially the same process may be employed to actuate latch pin 133G back to the retracted position. The process begins by energizing solenoid 139 to produce actuating force 326 on latch pin 133G by. Latch pin 133G may be formed with low coercivity ferromagnetic material, whereby drawing latch pin 133G into solenoid 139 reduces the reluctance in a path taken by flux from solenoid 139. This action is the same regardless of the direction of current through solenoid 139.

As shown in FIG. 29, actuating force 326 may drive latch pin 133G and cam 315 deeper into latch pin housing 325. Angled faces 310 of latch pin teeth 321 may act against angled faces 312 of cam teeth 319 to place a rotational force 314 on cam 315. Rotation of cam 315 may be resisted by fin 303 until cam teeth 319 clear fin 303. FIG. 29 shows electromagnetic latch assembly 150G at the point where cam teeth 319 are just clearing fin 303 and rotation of cam 315 may begin. From this point, cam 315 may rotate under the influence of force 326 until the tips 306 of cam teeth 319 encounter angled faces 322 of latch pin teeth 321 as shown in FIG. 30.

After actuating force 326 is removed by cutting power to solenoid 139, spring 317 may drive cam 315 to the left as shown in FIG. 31. A rotational force 314 may result on cam 315 from the interaction between an angled face 312 of a cam tooth 321 and fin 303. This may cause further rotation of cam 315. As cam 315 rotates, tips 306 of cam teeth 319 may press against angled faces 322 of latch pin teeth 321. A resultant force may compress spring 307 creating clearance for cam teeth 319 to rotate past latch pin teeth 321. Rotation of cam 315 may continue until slots 311 between adjacent cam teeth 319 align with fin 303 allowing cam 315 and latch pin 133G to extend under the influence of spring 317 until the extended position of FIG. 28 is reached.

The components and features of the present disclosure have been shown and/or described in terms of certain embodiments and examples. While a particular component or feature, or a broad or narrow formulation of that component or feature, may have been described in relation to only one embodiment or one example, all components and features in either their broad or narrow formulations may be combined with other components or features to the extent such combinations would be recognized as logical by one of ordinary skill in the art.

The invention claimed is:

1. A valvetrain for an internal combustion engine of a type that has a combustion chamber, a moveable valve having a seat formed in the combustion chamber, and a camshaft, the valvetrain comprising:
a rocker arm assembly comprising a rocker arm and a cam follower configured to engage a cam mounted on a camshaft as the camshaft rotates; and
a first coil that is mounted to the rocker arm; and
a second coil mounted to a component distinct from the rocker arm;
wherein the first and second coils form a system of magnetically coupled inductors at least while the cam is on base circle, whereby an alternating current in the second coil induces a voltage in the first coil.

2. A valvetrain according to claim 1, wherein the rocker arm assembly is operative to move the first coil through a range of motion relative to the second coil in relation to rotation of the cam.

3. A valvetrain according to claim 2, further comprising:
a pivot that provides a fulcrum for the rocker arm;
wherein the second coil is mounted to the pivot.

4. A valvetrain according to claim 2, wherein:
the rocker arm assembly comprises an electromagnetic latch assembly comprising a latch pin moveable between a first position and a second position by an electromagnet powered by an electrical circuit comprising the first coil;
placing the latch pin in the first position provides a configuration in which the rocker arm assembly is operative to actuate the moveable valve in response to rotation of the camshaft to produce a first valve lift profile; and
placing the latch pin in the second position provides a configuration in which the rocker arm assembly is operative to actuate the moveable valve in response to rotation of the camshaft to produce a second valve lift profile, which is distinct from the first valve lift profile, or the moveable valve is deactivated.

5. A valvetrain according to claim 2, further comprising:
a control unit; and
a sensor mounted to the rocker arm assembly;
wherein the sensor is operable to communicate with the control unit through induction between the first and second coils.

6. A valvetrain according to claim 2, further comprising:
a second rocker arm assembly comprising a second rocker arm and a second cam follower configured to engage a second cam mounted on the camshaft as the camshaft rotates; and
a third coil that is mounted to the second rocker arm;
wherein the second and third coils form a system of magnetically coupled inductors at least while the second cam is on base circle, whereby an alternating current in the second coil induces a voltage in the third coil.

7. A valvetrain according to claim 1, wherein:
the rocker arm assembly is operative to move the first coil through a range of motion relative to the second coil as the cam follower is lifted by the cam;
the first coil is mounted such that rotation of the cam by the camshaft causes a distance between the first coil and the second coil to vary; and
the distance is smallest when the cam is on base circle.

8. A valvetrain according to claim 1, wherein:
rotation of the cam is operative to cause the rocker arm to pivot about an axis; and
the first coil is mounted approximately on the axis about which the rocker arm pivots.

9. A valvetrain according to claim 1, further comprising:
a pivot that provides a fulcrum for the rocker arm;
wherein the second coil is mounted to the pivot.

10. A valvetrain according to claim 1, wherein:
the rocker arm assembly comprises an electromagnetic latch assembly comprising a latch pin moveable between a first position and a second position by an electromagnet powered by an electrical circuit comprising the first coil;
placing the latch pin in the first position provides a configuration in which the rocker arm assembly is operative to actuate the moveable valve in response to rotation of the camshaft to produce a first valve lift profile; and placing the latch pin in the second position provides a configuration in which the rocker arm assembly is operative to actuate the moveable valve in response to rotation of the camshaft to produce a second valve lift profile, which is distinct from the first valve lift profile, or the moveable valve is deactivated.

11. A valvetrain according to claim 10, wherein the rocker arm assembly is configured to keep the rocker arm substantially stationary relative to the combustion chamber when the electromagnet is energized.

12. A valvetrain according to claim 10, wherein the electromagnetic latch assembly is structured to both stably maintain the latch pin in the first position and stably maintain the latch pin in the second position independently from the electromagnet.

13. A valvetrain according to claim 12, wherein:
the electrical circuit comprises a switch having a first switch position and a second switch position;
with the switch in the first switch position, the electrical circuit is configured to direct DC current through the electromagnet in a first direction in response to the first coil being driven by AC current in the second coil; and
with the switch in the second switch position, the electrical circuit is configured to direct DC current through the electromagnet in a second direction, which is opposite the first direction, in response to the first coil being driven by AC current in the second coil.

14. A valvetrain according to claim 13, wherein the switch is coupled to the latch pin such that placing the latch pin in the first position places the switch in the first switch position and placing the latch pin in the second position places the switch in the second switch position.

15. A valvetrain according to claim 10, wherein the first coil is wound about a laminated core and is connected to the electromagnet through a rectifier.

16. A valvetrain according to claim 1, further comprising:
a control unit; and
a sensor mounted to the rocker arm assembly;
wherein the sensor is operable to communicate with the control unit through induction between the first and second coils.

17. A valvetrain according to claim 1, further comprising:
a second rocker arm assembly comprising a second rocker arm and a second cam follower configured to engage a second cam mounted on the camshaft as the camshaft rotates; and a third coil that is mounted to the second rocker arm;
wherein the second and third coils form a system of magnetically coupled inductors at least while the second cam is on base circle, whereby an alternating current in the second coil induces a voltage in the third coil.

18. A method of providing diagnostic information for a rocker arm assembly comprising a rocker arm and a cam follower configured to engage a cam mounted on a camshaft as the camshaft rotates, the method comprising:

mounting a first coil to the rocker arm;

mounting a second coil to a component distinct from the rocker arm in a position where the first coil and the second coil form a system of magnetically coupled inductors while the cam is on base circle, whereby an alternating current in the second coil induces a voltage in the first coil;

making one or more measurements of voltage, current, resistance, or impedance in a circuit comprising the second coil; and using the one or more measurements to obtain diagnostic information relating to the rocker arm assembly.

19. A method according to claim 18, where the second circuit is pulsed in relation to making the one or more measurements.

20. A method of providing diagnostic information for a rocker arm assembly comprising a rocker arm and a cam follower configured to engage a cam mounted on a camshaft as the camshaft rotates, the method comprising:

mounting a first coil to the rocker arm;

mounting a second coil to a component distinct from the rocker arm in a position where the first coil and the second coil form a system of magnetically coupled inductors while the cam is on base circle, whereby an alternating current in the second coil induces a voltage in the first coil;

making one or more measurements of voltage, current, resistance, or impedance in a circuit comprising the second coil; and using the one or more measurements to obtain diagnostic information relating to the rocker arm assembly;

wherein the rocker arm assembly is operative to move the first coil through a range of motion relative to the second coil in relation to rotation of the cam.

* * * * *